US008842608B2

(12) United States Patent
Suzuki et al.

(10) Patent No.: US 8,842,608 B2
(45) Date of Patent: Sep. 23, 2014

(54) WIRELESS COMMUNICATION SYSTEM, BASE STATION DEVICE, MOBILE STATION DEVICE, WIRELESS COMMUNICATION METHOD

(75) Inventors: Shoichi Suzuki, Osaka (JP); Daiichiro Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 378 days.

(21) Appl. No.: 13/120,358

(22) PCT Filed: Aug. 17, 2009

(86) PCT No.: PCT/JP2009/003912
§ 371 (c)(1),
(2), (4) Date: Mar. 22, 2011

(87) PCT Pub. No.: WO2010/032374
PCT Pub. Date: Mar. 25, 2010

(65) Prior Publication Data
US 2011/0200028 A1  Aug. 18, 2011

(30) Foreign Application Priority Data

Sep. 22, 2008 (JP) ................ P2008-243207

(51) Int. Cl.
*H04W 4/00* (2009.01)
*H04W 28/02* (2009.01)
*H04W 72/04* (2009.01)
*H04W 72/08* (2009.01)

(52) U.S. Cl.
CPC .......... *H04W 28/0231* (2013.01); *H04W 72/04* (2013.01); *H04W 72/08* (2013.01)
USPC ............................. 370/328; 370/468; 714/746

(58) Field of Classification Search
None
See application file for complete search history.

(56) References Cited

U.S. PATENT DOCUMENTS

2002/0172208 A1*  11/2002  Malkamaki ................... 370/400
2003/0125051 A1   7/2003  Leppisaari
(Continued)

FOREIGN PATENT DOCUMENTS

| CN | 101030932 A | 9/2007 |
| CN | 101174879 A | 5/2008 |

(Continued)

OTHER PUBLICATIONS

LG Electronics, Carrier Aggregation and Control Signaling for LTE-A, 3GPP TSG RAN WG1 #54 R1-082946, 3GPP, Aug. 18, 2008, pp. 1-5.

(Continued)

*Primary Examiner* — Bob Phunkulh
(74) *Attorney, Agent, or Firm* — Birch, Stewart, Kolasch & Birch, LLP

(57) ABSTRACT

A base station device, which allocates one or more subbands of each of an uplink and a downlink to a mobile station device and transmits response information, which indicates whether or not uplink data from the mobile station device has been properly received, to the mobile station device, the base station device includes: a control unit (11) which controls an arrangement of a response information group including multiple pieces of response information directed to a downlink subband allocated to the mobile station device; and a multiplexing unit (160) which collects the same type of multiple pieces of response information to configure the response information group, and arranges the configured response information group in the downlink subband based on the control of the control unit.

15 Claims, 30 Drawing Sheets

(56) References Cited

U.S. PATENT DOCUMENTS

| | | | |
|---|---|---|---|
| 2004/0109433 A1* | 6/2004 | Khan | 370/345 |
| 2005/0201325 A1* | 9/2005 | Kang et al. | 370/328 |
| 2005/0249162 A1* | 11/2005 | Kim et al. | 370/333 |
| 2006/0146760 A1 | 7/2006 | Khandekar et al. | |
| 2006/0195753 A1 | 8/2006 | Nam et al. | |
| 2007/0081485 A1 | 4/2007 | Li | |
| 2008/0212532 A1* | 9/2008 | Heo et al. | 370/330 |
| 2009/0016278 A1* | 1/2009 | Wakabayashi | 370/329 |
| 2009/0022110 A1* | 1/2009 | Muharemovic et al. | 370/336 |
| 2010/0046460 A1* | 2/2010 | Kwak et al. | 370/329 |
| 2010/0157836 A1* | 6/2010 | Aiba et al. | 370/252 |
| 2010/0195823 A1* | 8/2010 | Fukuoka et al. | 380/31 |
| 2010/0322165 A1* | 12/2010 | Yoo | 370/329 |
| 2011/0128941 A1* | 6/2011 | Ishii | 370/336 |

FOREIGN PATENT DOCUMENTS

| | | |
|---|---|---|
| CN | 101227703 A | 7/2008 |
| JP | 2009-507420 A | 2/2009 |
| JP | 2010-516208 A | 5/2010 |
| WO | WO 2007/027512 A2 | 3/2007 |
| WO | WO 2008/086532 A1 | 3/2007 |
| WO | WO 2010/013963 A2 | 2/2010 |

OTHER PUBLICATIONS

Qualcomm Europe, Carrier Aggregation Operation in LTE-Advanced, 3GPP TSG RAN WG1 #54 R1-083193, 3GPP, Aug. 18, 2008, pp. 1-4.

ZTE, General Control Channel Design for LTE-A, 3GPP TSG-RAN WG1 #54 R1-082848, 3GPP, Aug. 18, 2008, pp. 1-3.

3GPP TS36.211-v8.3.0 (May 2008), Physical Channels and Modulation (Release 8), pp. 56-60.

3GPP TS36.213-v8.3.0 (May 2008), Physical Layer Procedures (Release 8), pp. 40-42.

3GPP TSG RAN1 #53, Kansas City, USA, May 5-9, 2008, R1-081948, "Proposals for LTE-Advanced Technologies".

3GPP, "Technical Specification Group Radio Access Network: Evolved Universal Terrestrial Radio Access (E-UTRA); Physical Channels and Modulation (Release 8)", 3GPP TS 36.211, V8.3.0, May 2008, pp. 61-64.

* cited by examiner

| BIT SEQUENCE | NUMBER OF HARQ INDICATOR CHANNEL GROUPS | TYPE OF UPLINK SUBBAND CORRESPONDING TO HARQ INDICATOR CHANNEL GROUP |
|---|---|---|
| 000 | 0 | |
| 001 | 1 | (1) |
| 010 | 1 | (2) |
| 011 | 2 | (1, 2) |
| 100 | 2 | (2, 1) |

| CODE NUMBER | ORTHOGONAL CODE |
|---|---|
| 1 | [+1 +1 +1 +1] |
| 2 | [+1 −1 +1 −1] |
| 3 | [+1 +1 −1 −1] |
| 4 | [+1 −1 −1 +1] |
| 5 | [+j +j +j +j] |
| 6 | [+j −j +j −j] |
| 7 | [+j +j −j −j] |
| 8 | [+j −j −j +j] | ns/div# WIRELESS COMMUNICATION SYSTEM, BASE STATION DEVICE, MOBILE STATION DEVICE, WIRELESS COMMUNICATION METHOD

TECHNICAL FIELD

The present invention relates to a wireless communication system, a base station device, a mobile station device, and a wireless communication method.

This application claims priority to and the benefits of Japanese Patent Application No. 2008-243207 filed on Sep. 22, 2008, the disclosure of which is incorporated herein by reference.

BACKGROUND ART

The evolution of a 3rd generation (hereinafter, referred to as "3G") radio access (evolved universal terrestrial radio access (hereinafter, referred to as "EUTRA")) scheme and the evolution of a 3G network (evolved universal terrestrial radio access network (hereinafter, referred to as "EUTRAN")) of cellular mobile communication have been studied in 3G Partnership Project (3GPP).

In 3GPP, the study of a 4th generation (hereinafter, referred to as "4G") radio access (advanced EUTRA (hereinafter, referred to as "A-EUTRA")) scheme and a 4G network (advanced EUTRAN) of cellular mobile communication has been initiated. In A-EUTRA, those corresponding to a wider band than that of EUTRA and compatibility with EUTRA have been studied, and the communication of a base station device of A-EUTRA with a mobile station device of EUTRA using part of a frequency band of A-EUTRA has been proposed.

A layered orthogonal frequency division multiple access (OFDMA) scheme that performs communication using multiple frequency bands, which is multi-carrier transmission, for a downlink from a base station device to a mobile station device in A-EUTRA has been proposed. Also, for an uplink from a mobile station device to a base station device in A-EUTRA, switching of a single carrier-frequency division multiple access (SC-FDMA) scheme, which is single-carrier transmission, and the OFDMA scheme, which is multi-carrier transmission, and communication using multiple frequency bands as in the downlink have been proposed (Non-Patent Document 1).

FIG. 27 is a diagram showing a schematic structure of channels in EUTRA. A base station device BS1 wirelessly communicates with mobile station devices UE1, UE2, and UE3. A downlink of wireless communication from the base station device BS1 of EUTRA to the mobile station devices UE1, UE2, and UE3 includes a downlink pilot channel, a downlink synchronization channel, a broadcast channel, a downlink control channel, a downlink shared data channel, a control format indicator channel, a Hybrid Automatic Repeat reQuest (HARQ) indicator channel, and a multicast channel. In HARQ, an error is controlled by combining Automatic Repeat reQuest (ARQ) with an error correction code of turbo coding or the like. In HARQ using chase combining (CC), the retransmission of the same packet is requested if an error is detected from a received packet. Reception quality is improved by combining the two received packets. In HARQ using incremental redundancy (IR), error correction capability is enhanced by decreasing a coding rate when the number of retransmissions is increased since redundant bits are divided and sequentially retransmitted bit by bit.

An uplink of wireless communication from the mobile station devices UE1, UE2, and UE3 of EUTRA to the base station device BS1 includes an uplink pilot channel, a random access channel, an uplink control channel, and an uplink shared data channel.

FIG. 28 is a diagram showing a schematic configuration of an uplink radio frame in EUTRA (Section 5.2 of Non-Patent Document 2). For example, FIG. 28 shows a schematic configuration of a subframe of a radio frame when an uplink control channel and an uplink shared data channel are frequency-multiplexed. In FIG. 28, the horizontal axis is a time axis and the vertical axis is a frequency axis. An uplink radio frame includes multiple physical resource block (PRB) pairs. The PRB pair is a unit of radio resource allocation or the like, and includes a frequency band (PRB bandwidth) and a time band (2 slots=1 subframe), which have predetermined widths. Basically, 1 PRB pair includes 2 PRBs (PRB bandwidths×slots) which are continuous in a time domain.

In an uplink subframe, 1 PRB includes 12 subcarriers in a frequency domain, and includes 7 SC-FDMA symbols in the time domain. A system bandwidth is a communication bandwidth of a base station device. In the time domain, there are a slot including 7 SC-FDMA symbols, a subframe including 2 slots, and a radio frame including 10 subframes. A unit including 1 sub-carrier and 1 SC-FDMA symbol is referred to as a resource element. In the uplink radio frame, multiple PRBs corresponding to the system bandwidth are arranged in the frequency direction.

In each subframe of the uplink, at least an uplink shared data channel that is used in information data transmission and an uplink control channel that is used in control data transmission are arranged.

In FIG. 28, the uplink control channel is arranged in two ends of the system band, that is, a first PRB and a last PRB when viewed from a low frequency side. These resource blocks are hatched and shown. There is shown the case where uplink shared data channel is arranged in other PRBs, but the number of PRBs in which the uplink control channel is arranged is varied in a subframe unit. If the uplink control channel is arranged in multiple PRB pairs, the uplink control channel is arranged in order from the two ends of the system band.

The uplink control channel includes a channel quality indicator, a scheduling request indicator, and the like.

Since the random access channel and the uplink pilot channel are not related to the present invention, illustration and description thereof are omitted.

FIG. 29 is a diagram showing a schematic configuration of a downlink radio frame in EUTRA (Section 6.2 of Non-Patent Document 2). For example, FIG. 29 shows a schematic configuration of a subframe of a radio frame when a downlink control channel and a downlink shared data channel are time-multiplexed. These resource blocks are hatched and shown. In FIG. 29, the horizontal axis is a time axis and the vertical axis is a frequency axis.

A downlink radio frame includes multiple PRB pairs. The PRB pair is a unit of radio resource allocation or the like, and includes a frequency band (PRB bandwidth) and a time band (2 slots=1 subframe), which have predetermined widths. Basically, 1 PRB pair includes 2 PRBs (PRB bandwidths× slots) which are continuous in the time domain.

In a downlink subframe, 1 PRB includes 12 subcarriers in the frequency domain, and includes 7 orthogonal frequency division multiplexing (OFDM) symbols in the time domain. A system bandwidth is a communication bandwidth of a base station device. In the time domain, there are a slot including 7 OFDM symbols, a subframe including 2 slots, and a radio frame including 10 subframes. A unit including 1 sub-carrier and 1 OFDM symbol is referred to as a resource element. In the downlink radio frame, multiple PRBs corresponding to the system bandwidth are arranged in the frequency direction.

In each subframe of the downlink, at least a downlink shared data channel that is used in transmission of information data and system information and a downlink control channel that is used in control data transmission are arranged. Radio resource allocation of system information and information data within the downlink shared data channel is indicated by the downlink control channel.

A broadcast channel that is used in system information transmission is not shown in FIG. 29, and its arrangement will be described later. The system information includes information necessary for communication by a base station device and a mobile station device, and is periodically transmitted to a number of mobile station devices on the broadcast channel and the downlink shared data channel. Items of the system information arranged in the broadcast channel and the downlink shared data channel are different and the system information arranged in the broadcast channel includes information indicating a system bandwidth and the number of OFDM symbols arranged in the HARQ indicator channel, information for controlling the number of HARQ indicator channels, and the like. The system information arranged in the downlink shared data channel includes uplink and downlink transmission power control information and the like.

The HARQ indicator channel that is used in transmission of response information indicating whether reception of the uplink shared data channel has succeeded and failed is not shown in FIG. 29, and its arrangement will be described later.

Although not shown in FIG. 29, a downlink pilot channel that is used in channel estimation of the downlink shared data channel, the downlink control channel, and the like is arranged in predetermined positions of resource elements distributed in the frequency and time directions in a unit of 1 resource element.

Although not shown in FIG. 29, a control format indicator channel indicating the number of OFDM symbols constituting a downlink control channel is arranged in a predetermined frequency position of a first OFDM symbol.

FIG. 29 shows the case where the downlink control channel is arranged in first, second, and third OFDM symbols of the subframe, and the downlink shared data channel is arranged in other OFDM symbols, but OFDM symbols in which the downlink control channel is arranged are varied in a subframe unit and the downlink control channel may be arranged in only the first OFDM symbol, arranged in the first and second OFDM symbols, or arranged over the first to third OFDM symbols.

The downlink control channel and the downlink shared data channel are not arranged together in the same OFDM symbol. The downlink control channel includes multiple pieces of uplink radio resource allocation information, downlink radio resource allocation information, transmission power command information, and the like.

FIG. 30 is a diagram illustrating a broadcast channel arrangement in a downlink subframe of EUTRA (Section 6.6.4 of Non-Patent Document 2). In FIG. 30, the horizontal axis is a time axis and the vertical axis is a frequency axis. Here, only the downlink shared data channel and the broadcast channel are shown for simplification of description, and the downlink control channel and other channels are not shown.

The broadcast channel is arranged in first to fourth OFDM symbols of a second slot of a first subframe of the radio frame in the time domain and is arranged over 72 subcarriers of the center of the system band, that is, 6 PRBs, in the frequency domain.

Since the broadcast channel is arranged in a predefined time and frequency, a mobile station device can receive the broadcast channel before the initiation of communication with a base station device.

FIG. 31 is a diagram showing orthogonal codes that are used in code multiplexing in the frequency domain for the HARQ indicator channel (physical HARQ indicator channel: PHICH) of EUTRA (Non-Patent Document 2). The HARQ indicator channel is a channel on which response information indicating whether or not a base station device has properly received the uplink shared data channel transmitted from a mobile station device is transmitted. For example, the response information is expressed by 1 bit, wherein the success is indicated by "1" and the failure is indicated by "0".

In the HARQ indicator channel of EUTRA, the response information bit is modulated by binary phase shift keying (BPSK), and is code-multiplexed in the frequency domain using an orthogonal code in a modulation signal modulated by BPSK. In FIG. 31, for example, a sequence length is 4 orthogonal codes, orthogonal codes of code Nos. 1 to 4 are orthogonal codes that are code-multiplexed with respect to a real axis, orthogonal codes of code Nos. 5 to 8 are orthogonal codes that are code-multiplexed with respect to an imaginary axis, and a maximum of 8 HARQ indicator channels can be multiplexed in the frequency domain using a total of 8 orthogonal codes. As an orthogonal code sequence length, any of "2" and "4" is selected by a length of a cyclic prefix added to the OFDM symbol.

FIG. 32 is a diagram illustrating the correspondence of the uplink shared data channel that is transmitted by a mobile station device and the HARQ indicator channel that is transmitted by a base station device in EUTRA (Non-Patent Document 3).

In FIG. 32, the vertical axis represents a code number used in code multiplexing and the horizontal axis represents a number of a group of HARQ indicator channels (hereinafter, referred to as an "HARQ indicator channel group") configured by code-multiplexing multiple HARQ indicator channels. For example, FIG. 32 shows the case where the number of HARQ indicator channel groups is 3 when the number of codes is 8. The number of HARQ indicator channel groups is defined by information for controlling the number of PRBs included in a system band and the number of HARQ indicator channels given in the broadcast channel.

An HARQ indicator channel group number and a code number used when a base station device transmits response information to the uplink shared data channel transmitted by a mobile station device are associated with a cyclic shift value of the uplink pilot channel indicated by uplink radio resource allocation that is transmitted by the downlink control channel and a smallest PRB number of the uplink shared data channel allocated to the mobile station device.

The mobile station device recognizes an HARQ indicator channel group number and a code number addressed to its own mobile station device based on information included in the downlink control information.

In EUTRA, it is assumed that one uplink frequency band and one downlink frequency band to be used for communication are managed by one base station device, and it is assumed that the uplink frequency band in which the uplink shared data channel is arranged and the downlink frequency band in which the HARQ indicator channel is arranged are associated in one-to-one relation.

FIG. 33 is a diagram illustrating an HARQ indicator channel arrangement of EUTRA (Non-Patent Document 2). In FIG. 33, the horizontal axis is a time axis and the vertical axis is a frequency axis. For convenience of description, in FIG. 33, the frequency domain represents a system bandwidth, and the time domain represents the downlink control channel arranged in first to third OFDM symbols of a subframe. FIG. 33 shows the case where a code sequence length used in code multiplexing of the HARQ indicator channels is 4 and the number of HARQ indicator channel groups is 2. Also, FIG. 33 shows the case where each HARQ indicator channel is arranged over 3 OFDM symbols.

For simplification of description, the control format indicator channel and the downlink pilot channel are not shown.

In a first OFDM symbol, HARQ indicator channels of an HARQ indicator group 1 are arranged in 4 resource elements in order from a lower side of the frequency domain.

Next, HARQ indicator channels of an HARQ indicator channel group 2 are arranged in 4 resource elements from a resource element next to the resource elements in which the HARQ indicator channels of the HARQ indicator channel group 1 are arranged. Going into details, for example, a signal obtained by multiplying a modulation signal into which response information is BPSK-modulated by each code element of a code of a sequence length 4 is arranged in each resource element.

The same signal as that arranged in the first OFDM symbol is arranged in second and third OFDM symbols. That is, the same signal is multiplexed in the frequency direction. However, when the arrangement is made in the second and third OFDM symbols, an HARQ indicator channel group to be arranged iteratively is uniformly distributed and arranged in the frequency direction.

In addition to the case where the HARQ indicator channel group to be iteratively arranged is distributed and arranged in 3 OFDM symbols as shown in FIG. 33, there is the case where the HARQ indicator channel group to be iteratively arranged is arranged centrally in only a first OFDM symbol. An arrangement to be made by the base station device is indicated using information representing the number of OFDM symbols in which the HARQ indicator channel given in the broadcast channel is arranged. Since the multicast channel and the downlink synchronization channel are not related to the present invention, detailed description thereof is omitted.

FIG. 34 is a diagram illustrating layered OFDMA proposed as a downlink radio access scheme of A-EUTRA (Non-Patent Document 1). In FIG. 34, the horizontal axis is a time axis and the vertical axis is a frequency axis.

A layered OFDMA system band includes multiple continuous frequency bands or multiple discontinuous frequency bands. The case where a situation in which a base station device and a mobile station device perform communication in 1 frequency band and a situation in which a base station device and a mobile station device perform communication simultaneously in multiple frequency bands are mixed within the system band has been proposed.

In terms of mobile station devices, the case where mobile station devices capable of simultaneously receiving only 1 frequency band and mobile station devices capable of simultaneously receiving multiple frequency bands are mixed has been proposed.

Hereinafter, a frequency band unit as described above is referred to as a "subband". In other words, the subband is a region serving as a unit in which a frequency domain used in communication with a mobile station device is allocated among regions into which radio resources are divided by a base station device in the frequency direction. Sizes of subbands constituting a system band of the base station device may be different respectively.

In FIG. 34, a mobile station device UE1 is allocated subbands 1 to 5, that is, all bands, a mobile station device UE2 is allocated the subband 5, and a mobile station device UE3 is allocated the subbands 1 to 3.

Since each mobile station device is capable of receiving only the allocated subband signal(s), a downlink control channel for each mobile station device is arranged in the subband(s) allocated to each mobile station device.

FIG. 35 is a diagram illustrating a scheme proposed as the uplink radio access scheme of A-EUTRA (Non-Patent Document 1). In FIG. 35, the horizontal axis is a time axis and the vertical axis is a frequency axis. In FIG. 35, there is shown the case where the uplink system band includes 2 subbands, the mobile station device UE1 is capable of transmitting subbands 1 and 2, the mobile station device UE2 is capable of transmitting the subband 2, and the mobile station device UE3 is capable of transmitting the subband 1 if the uplink radio access scheme is SC-FDMA.

As another example, there is shown the case where the mobile station device UE1 is allocated a resource of the subband 1, the subband 2, or the subbands 1 and 2 from the base station device, the mobile station device UE2 is allocated only a resource of the subband 2 from the base station device, and the mobile station device UE3 is allocated only a resource of the subband 1 from the base station device. Even in the uplink like the downlink, the case where the use of a frequency band of the mobile station device is limited and the mobile station device communicates with the base station device in only a limited frequency band has been proposed.

Non-Patent Document 1: 3GPP TSG RAN1 #53, Kansas City, USA, 5-9 May, 2008, R1-081948 "Proposals for LTE-Advanced Technologies"

Non-Patent Document 2: 3GPP TS36.211-v8.3.0 (2008-05), Physical Channels and Modulation (Release 8)

Non-Patent Document 3: 3GPP TS36.213-v8.3.0 (2008-05), Physical Layer Procedures (Release 8)

DISCLOSURE OF INVENTION

Problem to be Solved by the Invention

However, in a wireless communication system in which a base station device and a mobile station device perform communication using subbands in the uplink and the downlink, an HARQ indicator channel arrangement of the related art has a problem in that the mobile station device limited in a subband may not receive an HARQ indicator channel. That is, there is a problem in that a mobile station device limited in a subband is capable of receiving an HARQ indicator channel when the HARQ indicator channel is arranged in a subband capable of being used by the mobile station device, but is incapable of receiving an HARQ indicator channel when the HARQ indicator channel is arranged in a subband incapable of being used by the mobile station device.

In the HARQ indicator channel arrangement of the related art, there is a problem in that a mobile station device capable of using multiple subbands of the downlink may not receive an HARQ indicator channel since it may not know where the HARQ indicator channel is arranged in any of the multiple subbands of the downlink capable of being used by the mobile station device.

The present invention has been made in view of the above-described circumstances, and an object of the invention is to provide a technique in which a mobile station device can properly receive response information in a wireless communication system in which a base station device communicates with the mobile station device using subbands in an uplink and a downlink.

Means for Solving the Problem

A first aspect of the present invention is a wireless communication system including multiple mobile station devices and a base station device, which allocates one or more subbands of each of an uplink and a downlink to the mobile station device and transmits response information indicating whether or not uplink data has been properly received from the mobile station device, wherein the base station device includes: a control unit which controls an arrangement of a response information group including multiple pieces of response information directed to a downlink subband allocated to the mobile station device and generates response information group setting information regarding an arrangement directed to a subband of the response information group; and a multiplexing unit which collects the same type of multiple pieces of response information to configure the response information group, and arranges the configured response information group in the downlink subband based on the control of the control unit, and the mobile station device includes: a control unit which recognizes a downlink subband in which the response information group is arranged based on the response information group setting information and controls extraction of the response information addressed to its own mobile station device from the recognized subband; a demultiplexing unit which extracts the response information addressed to its own mobile station from the downlink subband based on the control of the control unit; and a decoding unit which decodes the response information addressed to its own mobile station device extracted by the demultiplexing unit.

In the wireless communication system, the multiplexing unit of the base station device may configure the response information group corresponding to an uplink subband by collecting multiple pieces of response information corresponding to multiple data arranged in the same subband of the uplink as the same type of the multiple pieces of response information.

In the wireless communication system, the control unit of the base station device may control the multiplexing unit to regenerate a response information group corresponding to one subband of the uplink and arrange each regenerated response information group in multiple subbands of the downlink.

In the wireless communication system, the control unit of the base station device may control the multiplexing unit to arrange multiple response information groups corresponding to multiple subbands of the uplink in one subband of the downlink.

In the wireless communication system, the control unit of the mobile station device may control the demultiplexing unit to recognize the multiple subbands of the downlink and extract the response information addressed to its own mobile station device from the recognized subbands, the demultiplexing unit may extract the response information addressed to its own mobile station device from each subband based on the control of the control unit, and the decoding unit may perform decoding using all the response information addressed to its own mobile station device extracted by the demultiplexing unit.

In the wireless communication system, the control unit of the base station device may generate response information group setting information including information indicating the number of the response information groups arranged in one subband of the downlink and information indicating the uplink subband corresponding to each of the multiple response information groups, and the control unit of the mobile station device may recognize the number of the response information groups and the uplink subband corresponding to each of the multiple response information groups from the response information group setting information.

In the wireless communication system, the control unit of the base station device may control the multiplexing unit to arrange the response information group setting information in a channel arranged in a fixed unit among multiple units prescribed from a frequency domain and a time domain having predetermined widths within the downlink subband.

In the wireless communication system, the control unit of the base station device may control the multiplexing unit to arrange the response information group setting information in a channel arranged in a unit indicated by a control channel among multiple units prescribed from a frequency domain and a time domain having predetermined widths within the downlink subband.

In the wireless communication system, the control unit of the base station device may control the multiplexing unit to arrange the multiple response information groups, which are arranged in one subband of the downlink, in a unit selected according to a predetermined rule among multiple units prescribed from a frequency domain and a time domain having predetermined widths within the subband, and the control unit of the mobile station device may control the demultiplexing unit to extract multiple response information groups arranged in one band of the downlink according to a predetermined rule.

In the wireless communication system, the control unit of the base station device may control the multiplexing unit to arrange the multiple response information groups, which are arranged in one subband of the downlink, in units which are continuous in a frequency direction among multiple units prescribed from a frequency domain and a time domain having predetermined widths within the subband.

In the wireless communication system, the control unit of the base station device may control the multiplexing unit to arrange the multiple response information groups, which are arranged in one subband of the downlink, in a response information group unit in units which are distributed in a frequency direction among multiple units prescribed from a frequency domain and a time domain having predetermined widths within the subband.

In the wireless communication system, the multiplexing unit of the base station device may configure a result obtained by code-multiplexing multiple pieces of response information corresponding to multiple data arranged in the same subband of the uplink as a response information group, and the control unit of the base station device may control the multiplexing unit to arrange the multiple response information groups in units which are continuous in a frequency direction among multiple units prescribed from a frequency domain and a time domain having predetermined widths within one subband of the downlink.

In the wireless communication system, the control unit of the base station device: may control the multiplexing unit to arrange information, which is part of the response information group setting information, indicating the number of the response information groups, which are arranged in one subband of the downlink, in a fixed unit among multiple units prescribed from a frequency domain and a time domain having predetermined widths within the downlink subband, and may control the multiplexing unit to arrange information, which is part of the response information group setting information, indicating the uplink subband corresponding to the response information group in a channel arranged in a unit indicated by a control channel among the multiple units.

In the wireless communication system, the control unit of the base station device: may control the multiplexing unit to arrange a response information group corresponding to the uplink subband in the downlink subband according to a predetermined rule, and may generate information indicating the number of the response information groups, which are arranged in the downlink subband, as the response information group setting information.

In the wireless communication system, the control unit of the base station device: may control the multiplexing unit to arrange a predetermined number of pieces of response information in the downlink subband, and may generate information indicating the uplink subband corresponding to each response group as the response information group setting information.

A second aspect of the present invention is a base station device, which allocates one or more subbands of each of an uplink and a downlink to a mobile station device and transmits response information, which indicates whether or not uplink data from the mobile station device has been properly received, to the mobile station device, the base station device including: a control unit which controls an arrangement of a response information group including multiple pieces of response information directed to a downlink subband allocated to the mobile station device; and a multiplexing unit which collects the same type of multiple pieces of response information to configure the response information group, and arranges the configured response information group in the downlink subband based on the control of the control unit.

In the base station device, the control unit may further generate response information group setting information regarding an arrangement of the response information group.

A third aspect of the present invention is a mobile station device, which transmits/receives data using one or more subbands allocated to each of a downlink and an uplink and receives response information, which indicates whether or not a base station device has properly received uplink data, from the base station device, the mobile station device including: a control unit which recognizes a downlink subband in which a response information group is arranged based on response information group setting information regarding an arrangement of the response information group including multiple pieces of response information and controls extraction of the response information addressed to its own mobile station device from the recognized subband; a demultiplexing unit which extracts the response information addressed to its own mobile station from the downlink subband based on the control of the control unit; and a decoding unit which decodes the response information addressed to its own mobile station device extracted by the demultiplexing unit.

A fourth aspect of the present invention is a wireless communication method for use in a base station device, which allocates one or more subbands of each of an uplink and a downlink to a mobile station device and transmits response information, which indicates whether or not uplink data from the mobile station device has been properly received, to the mobile station device, the wireless communication method including: collecting the same type of multiple pieces of response information to configure the response information group; controlling an arrangement of the response information group configured in the collection directed to a downlink subband allocated to the mobile station device; and arranging the response information group configured in the collection in the downlink subband based on the control.

The wireless communication method may further include: generating response information group setting information regarding the arrangement of the response information group.

A fifth aspect of the present invention is a wireless communication method for use in a mobile station device, which transmits/receives data using one or more subbands allocated to each of a downlink and an uplink and receives response information, which indicates whether or not a base station device has properly received uplink data, from the base station device, the wireless communication method including: recognizing a downlink subband in which a response information group is arranged based on response information group setting information regarding an arrangement of the response information group including multiple pieces of response information; controlling extraction of the response information addressed to its own mobile station device from the subband recognized in the recognition; extracting the response information addressed to its own mobile station from the downlink subband based on the control; and decoding the response information addressed to its own mobile station device extracted in the extraction.

Effect of the Invention

According to the present invention, there is an advantageous effect in that a mobile station device can properly receive response information (an HARQ indicator channel) in a wireless communication system in which a base station device communicates with the mobile station device using subbands in an uplink and a downlink.

BRIEF DESCRIPTION OF THE DRAWINGS

Embodiments of the present invention will now be described with reference to the drawings. According to the present embodiment, a wireless communication system includes multiple mobile station devices 2 and a base station device 1. The multiple mobile station devices 2 and the base station device 1 mutually transmit/receive signals (information) by wireless communication. A wireless communication downlink from the base station device 1 to the mobile station device 2 includes a downlink shared data channel, a control format indicator channel, an HARQ indicator channel, a broadcast channel, a downlink control channel, and a downlink pilot channel. A wireless communication uplink from the mobile station device 2 to the base station device 1 includes an uplink control channel, an uplink shared data channel, and an uplink pilot channel.

Figure 1:
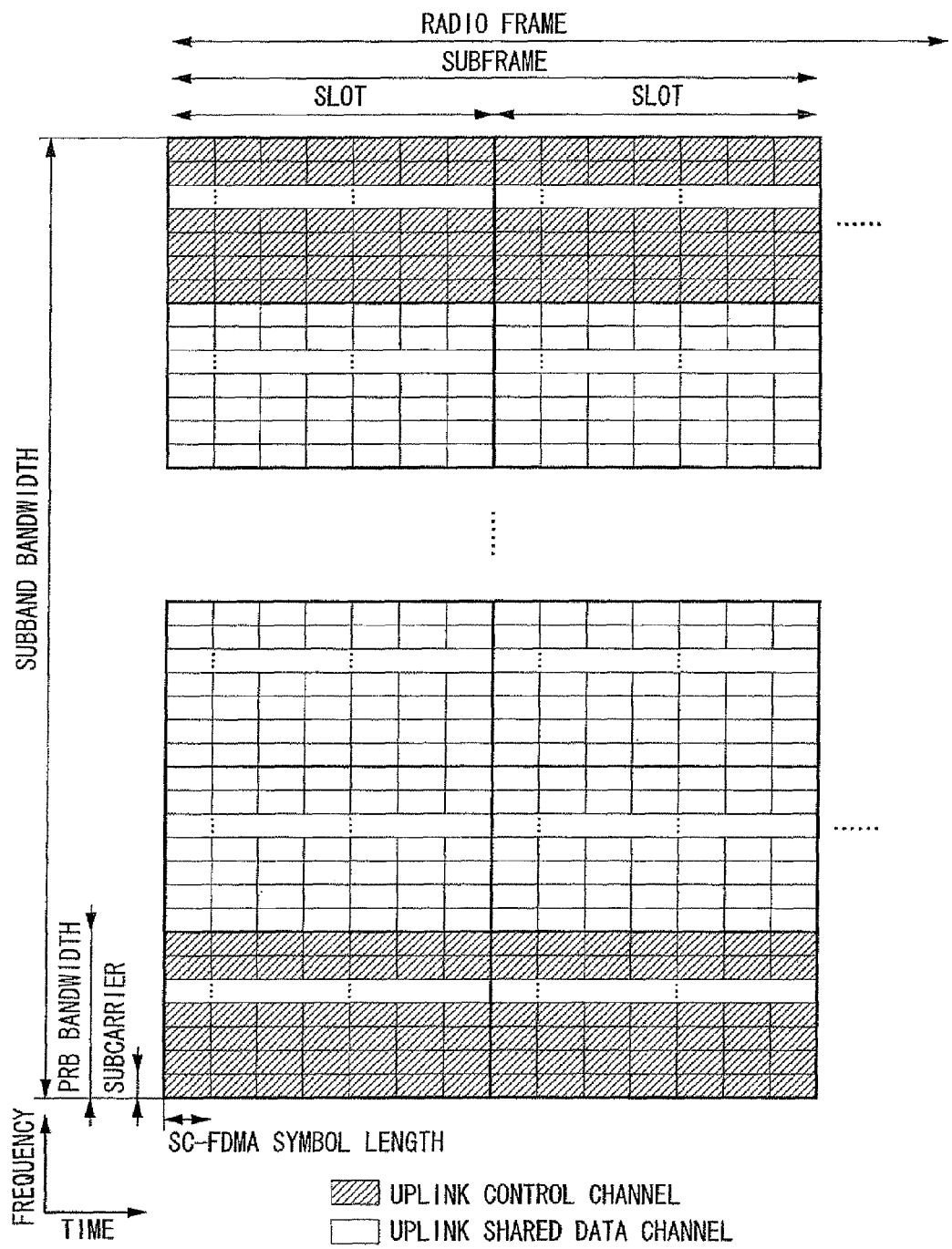
FIG. 1 is a diagram showing a schematic configuration of an uplink radio frame according to a present embodiment.

FIG. 1 is a diagram showing a schematic configuration of an uplink radio frame (radio resource) according to the present embodiment. In FIG. 1, the horizontal axis is a time axis and the vertical axis is a frequency axis. The uplink radio frame is a unit of radio resource allocation or the like to each mobile station device 2, and includes a PRB pair having a frequency band and a time band, which have predetermined widths. Basically, 1 PRB pair includes 2 PRBs which are continuous in a time domain.

One PRB includes 12 subcarriers in a frequency domain, and includes 7 SC-FDMA symbols in the time domain. A system bandwidth is a communication bandwidth of the base station device 1. In response to the system bandwidth, multiple PRBs are arranged in an uplink radio frame. In the time domain, there are a slot including 7 SC-FDMA symbols, a subframe including 2 slots, and a radio frame including 10 subframes. In the uplink radio frame, multiple PRBs are arranged in response to the system bandwidth.

In each subframe, at least an uplink shared data channel that is used in information data transmission and an uplink control channel that is used in control data transmission are arranged. An uplink pilot channel that is used in channel estimation of the uplink shared data channel and the uplink control channel is also arranged, but its illustration is omitted in FIG. 1 for simplification of description. FIG. 1 shows the case where the uplink control channel is arranged in a first PRB and a last PRB of the system bandwidth, and the uplink shared data channel is arranged in other PRBs, but the number of PRBs in which the uplink control channel is arranged is controlled by system information of the broadcast channel of the base station device 1.

The uplink control channel includes a channel quality indicator, a scheduling request indicator, and the like.

Figure 2:
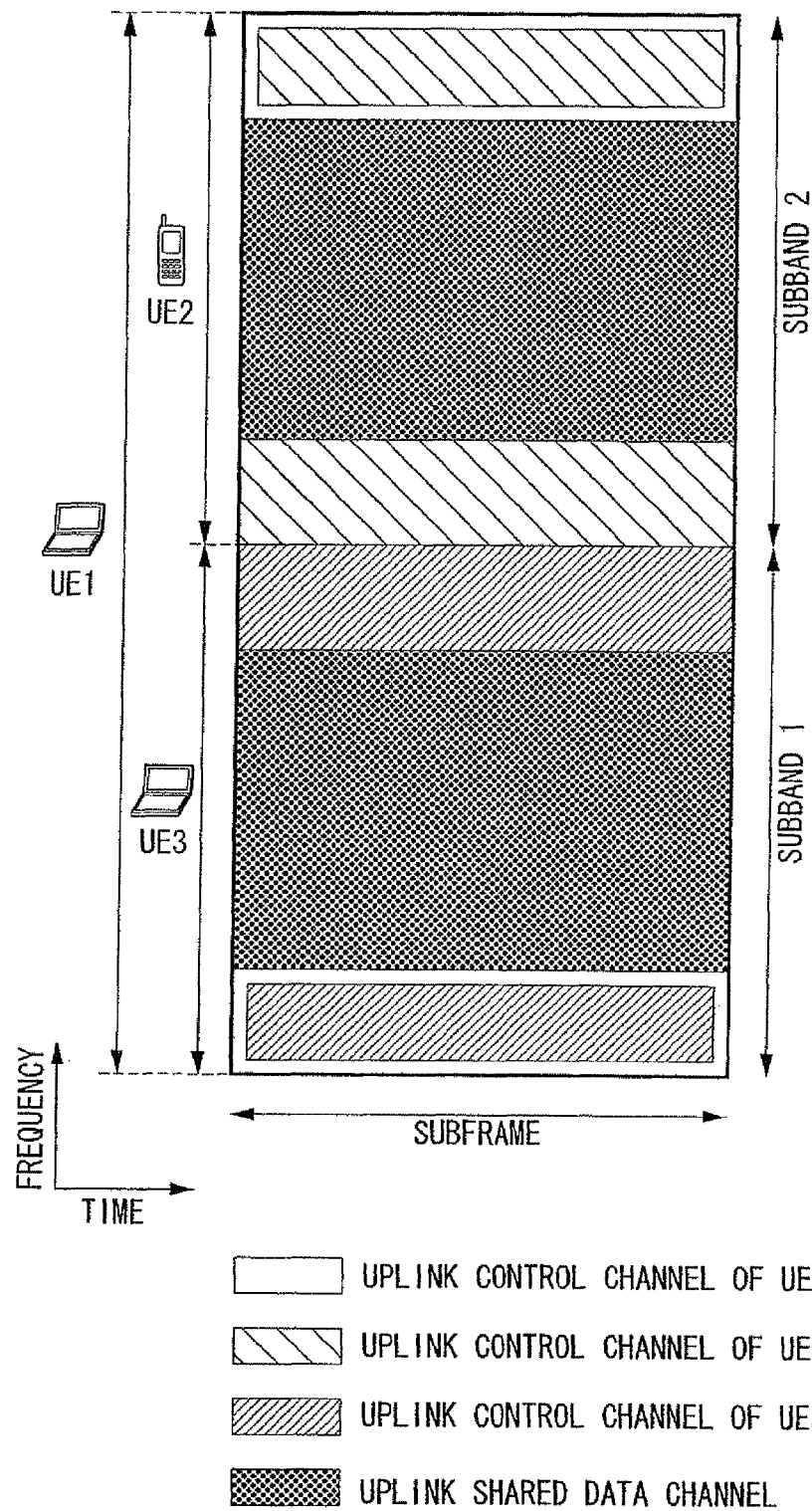
FIG. 2 is a diagram illustrating the allocation of subbands of an uplink radio frame to mobile station devices according to the present embodiment.

FIG. 2 is a diagram illustrating the allocation of subbands of an uplink radio frame (radio resource) to mobile station devices 2 according to the present embodiment. In FIG. 2, the horizontal axis is a time axis and the vertical axis is a frequency axis. In FIG. 2, the system bandwidth of the uplink radio frame includes 2 subbands. The subbands are numbered in order from a low-frequency subband. In FIG. 2, a mobile station device UE1 is allocated subbands 1 and 2, the mobile station device UE2 is allocated the subband 2, and the mobile station device UE3 is allocated the subband 1.

Figure 3:
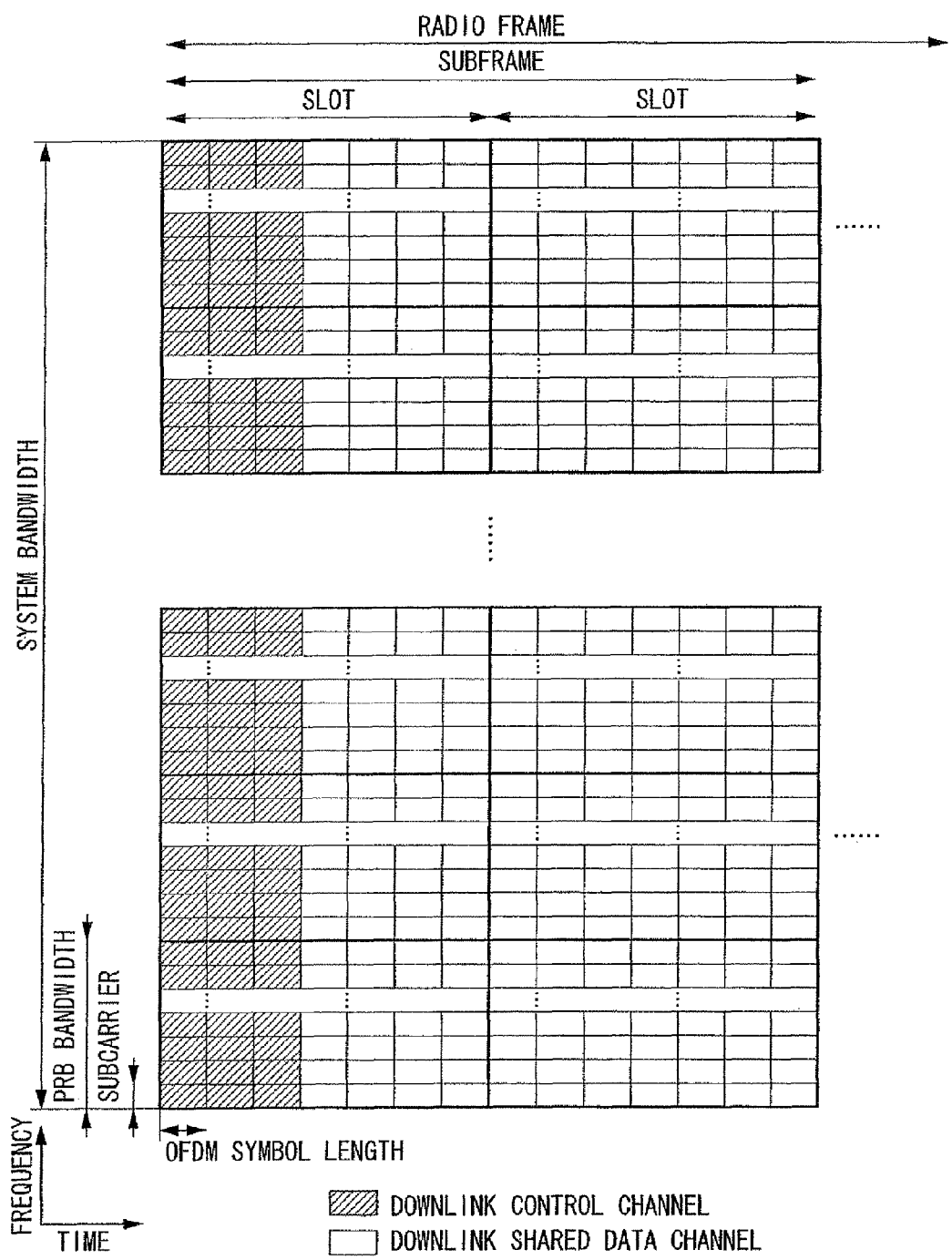
FIG. 3 is a diagram showing a schematic configuration of a downlink radio frame according to the present embodiment.

FIG. 3 is a diagram showing a schematic configuration of a downlink radio frame according to the present embodiment. In FIG. 3, the horizontal axis is a time axis and the vertical axis is a frequency axis. The downlink radio frame includes PRB pairs as those of the uplink radio frame. Basically, 1 PRB pair includes 2 PRBs which are continuous in the time domain.

In the downlink radio frame, 1 PRB includes 12 subcarriers in the frequency domain, and includes 7 OFDM symbols in the time domain. The system bandwidth is a communication bandwidth of the base station device 1. In the time domain, there are a slot including 7 OFDM symbols, a subframe including 2 slots, and a radio frame including 10 subframes. A unit including 1 sub-carrier and 1 OFDM symbol is referred to as a resource element. In the downlink radio frame, multiple PRBs are arranged in response to the system bandwidth.

In each subframe, at least a downlink shared data channel that is used in transmission of information data and system information and a downlink control channel that is used in control data transmission are arranged. A system information arrangement of information data and system information within the downlink shared data channel is indicated by the downlink control channel.

The broadcast channel that is used in the system information transmission is not shown in FIG. 3, and its arrangement will be described later. The system information includes information necessary for communication by the base station device 1 and the mobile station device 2, is periodically transmitted to the multiple mobile station devices 2 on the broadcast channel and the downlink shared data channel. The system information arranged in the broadcast channel and the downlink shared data channel is different.

The HARQ indicator channel that is used in transmission of response information indicating whether the reception of the uplink shared data channel transmitted by the mobile station device 2 has succeeded or failed is not shown in FIG. 3, and its arrangement will be described later. The downlink pilot channel that is used in channel estimation of the downlink shared data channel and the downlink control channel is not shown in FIG. 3 for simplification of description.

Although not shown in FIG. 3 for simplification of description, the control format indicator channel indicating the number of OFDM symbols constituting the downlink control channel is arranged in a predetermined frequency position of a first OFDM symbol for each subframe. FIG. 3 shows the case where the downlink control channel is arranged in first, second, and third OFDM symbols of the subframe and the downlink shared data channel is arranged in other OFDM symbols, but OFDM symbols in which the downlink control channel is arranged are varied in a subframe unit.

The downlink control channel and the downlink shared data channel are not arranged together in the same OFDM symbol. The downlink control channel includes multiple pieces of uplink radio resource allocation information, downlink radio resource allocation information, transmission power command information, and the like.

Figure 4:
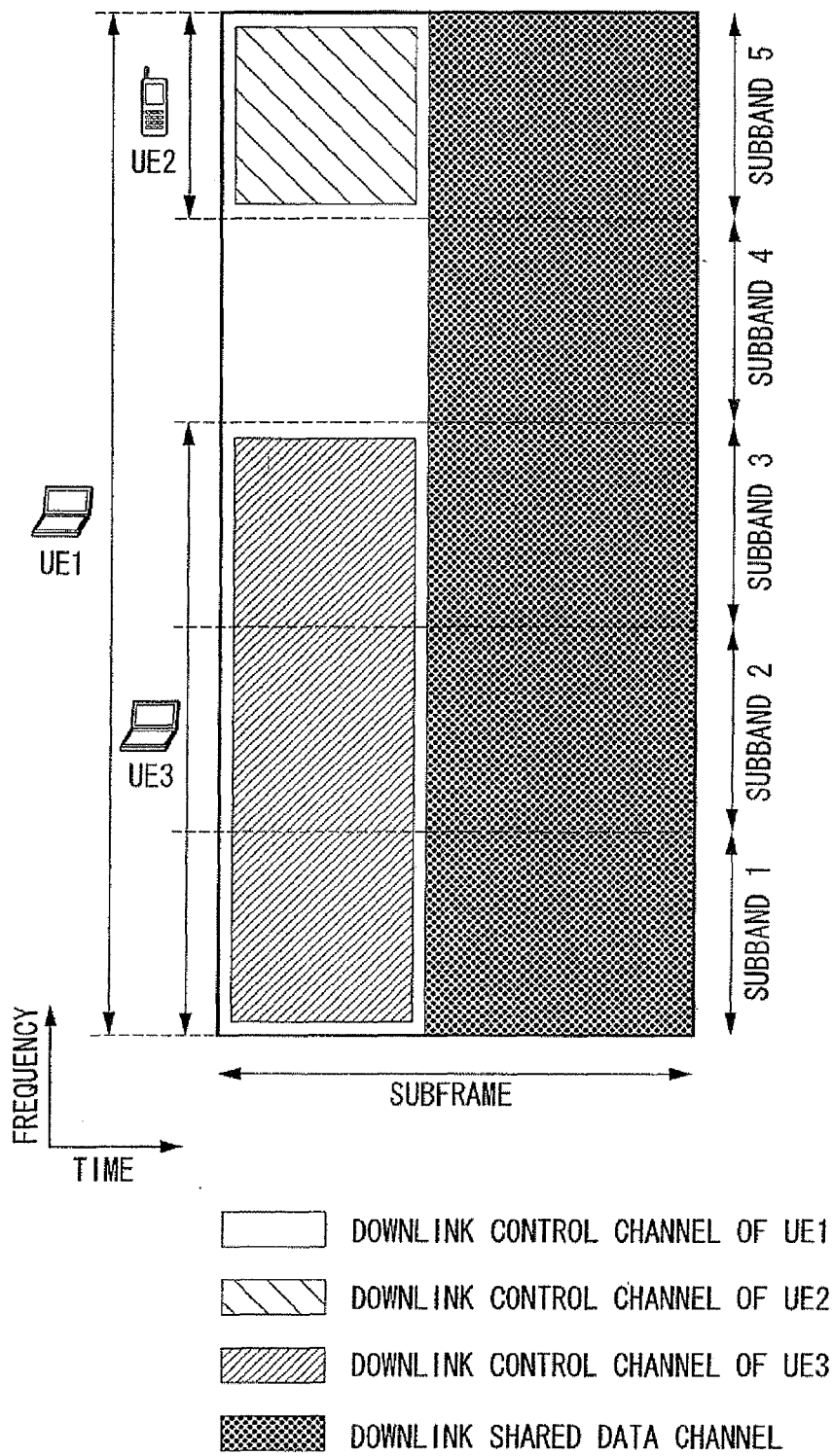
FIG. 4 is a diagram illustrating the allocation of subbands of a downlink radio frame to mobile station devices according to the present embodiment.

FIG. 4 is a diagram illustrating the allocation of subbands of a downlink radio frame (radio resource) to mobile station devices 2. In FIG. 4, the horizontal axis is a time axis and the vertical axis is a frequency axis. In FIG. 4, a system bandwidth of the downlink radio frame includes 5 subbands. The subbands are numbered in order from a low-frequency subband. In FIG. 4, a mobile station device UE1 is allocated subbands 1 to 5, that is, all subbands, a mobile station device UE2 is allocated the subband 5, and a mobile station device UE3 is allocated the subbands 1 to 3. Each mobile station device 2 receives the downlink control channel, the downlink shared data channel, and the like included in the allocated subband(s).

The base station device 1 of the present embodiment frequency-multiplexes an HARQ indicator channel with the downlink control channel to arrange the frequency-multiplexed channels, makes an arrangement by frequency multiplexing and code multiplexing between HARQ indicator channels, and transmits an arrangement result to the mobile station device 2. The base station device 1 arranges a channel on which HARQ indicator channel setting information (also referred to as "response information group setting information") regarding an arrangement directed to a subband of an HARQ indicator channel group cluster (to be described later), that is, information indicating the number of HARQ indicator channel groups arranged in downlink subbands and information indicating which uplink subband is for the arranged HARQ indicator channel group (information indicating an uplink subband corresponding to the HARQ indicator channel group), is transmitted, in each downlink subband, and transmits the channel to the mobile station device 2. The HARQ indicator channel setting information is included in any of system information arranged in the downlink shared data channel, system information arranged in the broadcast channel, or the control format indicator channel.

Figure 5:
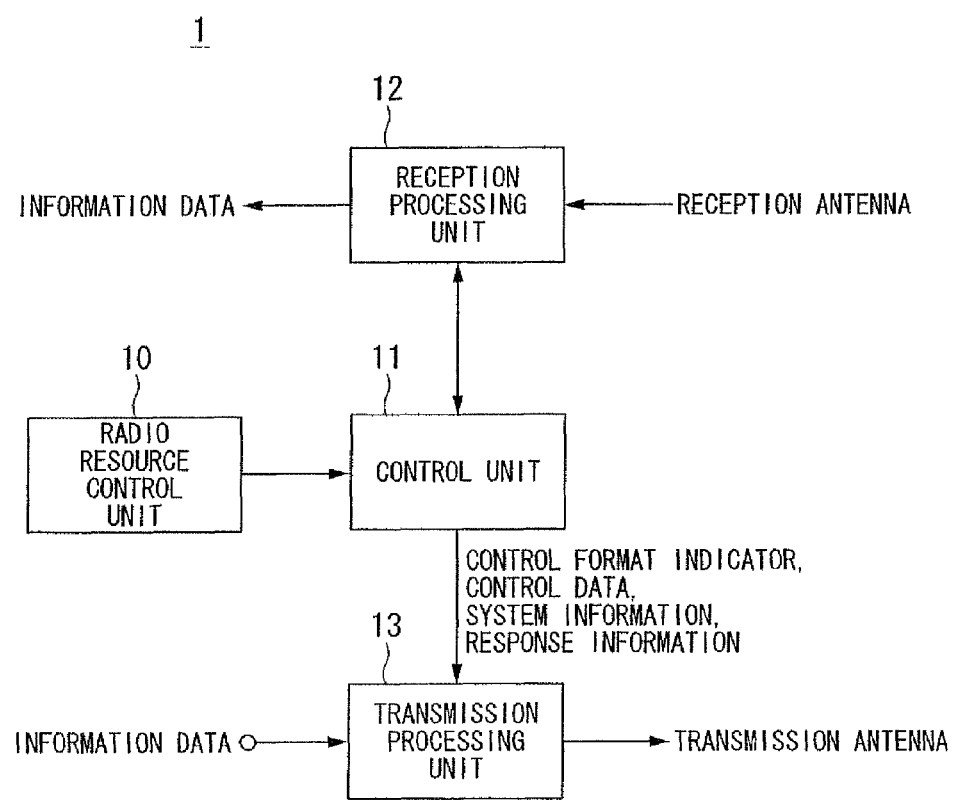
FIG. 5 is a schematic block diagram showing a configuration of a base station device according to the embodiment of the present invention.

FIG. 5 is a schematic block diagram showing a configuration of the base station device 1 according to an embodiment of the present invention. As shown in FIG. 5, the base station device 1 includes a radio resource control unit 10, a control unit 11, a reception processing unit 12, and a transmission processing unit 13. The radio resource control unit 10 manages a cycle of intermittent transmission/reception to/from the mobile station device 2, a modulation scheme/coding rate and transmission power of the downlink shared data channel, radio resource allocation of the downlink shared data channel, the number of OFDM symbols constituting the downlink control channel, multiplexing of the downlink control channel, the downlink shared data channel, or the HARQ indicator channel, or the like, and the like, outputs control signals indicating management contents to the control unit 11, and also reports them as a control format indicator, control data, system information, and response information to the mobile station device 2 through the control unit 11 and the transmission processing unit 13.

The control unit 11 outputs control signals to the transmission processing unit 13 and the reception processing unit 12 so as to control the transmission processing unit 13 and the reception processing unit 12 based on the control signals input from the radio resource control unit 10. The control unit 11 performs control of arrangement setting directed to a resource element of each channel, setting of an orthogonal code to be multiplied by the HARQ indicator channel, and the like, for the transmission processing unit 13 and the reception processing unit 12.

The control unit 11 generates response information to be arranged in the HARQ indicator channel input from the reception processing unit 12, system information to be arranged in the broadcast channel and the downlink shared data channel input from the ratio resource control unit 10, a control format indicator arranged in the control format indicator channel, and control data arranged in the downlink control channel, and instructs the transmission processing unit 13 to transmit them.

The transmission processing unit 13 generates the downlink shared data channel, the control format indicator channel, the HARQ indicator channel, the broadcast channel, the downlink control channel, and the downlink pilot channel based on inputs from the control unit 11, multiplexes the channels into a downlink radio frame, and transmits the frame to each mobile station device 2 via multiple transmission antennas, for example, 4 transmission antennas.

Based on an input from the control unit 11, the reception processing unit 12 receives the uplink control channel, the uplink shared data channel, and the uplink pilot channel transmitted by each mobile station device 2 via a reception antenna. Response information indicating whether the reception of the uplink shared data channel has succeeded or failed is output to the control unit 11. Since processing (the reception processing unit) related to the uplink is not directly related to the present invention, description thereof is omitted.

Figure 6:
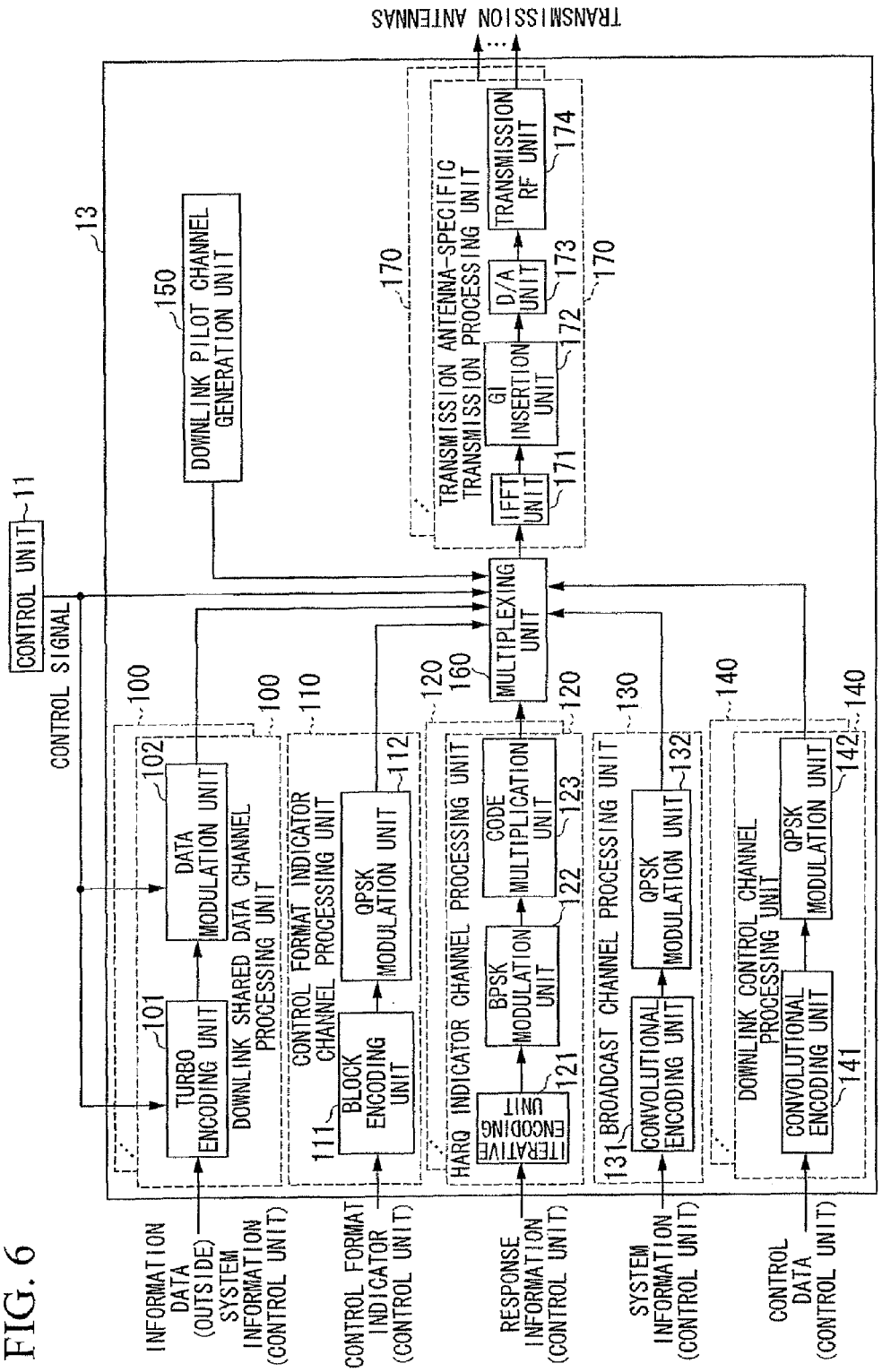
FIG. 6 is a schematic block diagram showing an internal configuration of a transmission processing unit of the base station device of FIG. 5.

FIG. 6 is a schematic block diagram showing an internal configuration of the transmission processing unit 13 of the base station device 1 of FIG. 5. The transmission processing unit 13 of the base station device 1 includes multiple downlink shared data channel processing units 100, a control format indicator channel processing unit 110, multiple HARQ indicator channel processing units 120, a broadcast channel processing unit 130, multiple downlink control channel processing units 140, a downlink pilot channel generation unit 150, a multiplexing unit 160, and multiple transmission antenna-specific transmission processing units 170. The multiple downlink shared data channel processing units 100, the multiple HARQ indicator channel processing units 120, and the multiple transmission antenna-specific transmission processing units 170 respectively have the same configuration and function.

Each channel processing unit performs processing of each channel for information data input from the outside and the system information, the response information, and the like input from the control unit 11. That is, each channel processing unit receives information transmitted on the channel, encodes and modulates the information, and generates a signal addressed to a corresponding mobile station device 2 or a signal addressed to a number of other mobile station devices 2 that are not recognized. Each channel processing unit includes a coding unit that performs coding for the signals and a modulation unit that performs data modulation for the signals. A code to be used in the coding and a modulation scheme to be used in the data modulation differ according to each channel processing unit.

Each of the transmission antenna-specific transmission processing units 170 transmits a signal multiplexed by the multiplexing unit 160 for each transmission antenna via each transmission antenna. Each of the transmission antenna-specific transmission processing units 170 includes an IFFT (inverse fast Fourier transform) unit 171, a GI (guard interval) insertion unit 172, a D/A (digital to analog) conversion unit 173, and a transmission RF (radio frequency) unit 174. Functions of the IFFT unit 171, the GI insertion unit 172, the D/A unit 173, and the transmission RF unit 174 will be described later.

Each of the downlink shared data channel processing units 100 performs baseband processing for transmitting information data input from the outside and system information input from the control unit 11 (hereinafter, the information data and the system information are collectively referred to as "data") in an OFDM scheme. That is, the turbo encoding unit 101 of the downlink shared data channel processing unit 100 performs error correction coding by a turbo code for improving the error resilience of the input data. The data modulation unit 102 generates a modulation symbol by modulating data error-correction-coded by the turbo encoding unit 101 in a modulation scheme such as QPSK, 16 quadrature amplitude modulation (16QAM), or 64 quadrature amplitude modulation (64QAM) based on a control signal from the control unit 11, and outputs the modulation symbol to the multiplexing unit 160.

The control format indicator channel processing unit 110 performs baseband processing for transmitting a control format indicator input from the control unit 11 in the OFDM scheme. That is, a block encoding unit 111 of the control format indicator channel processing unit 110 performs error coding by a block code for improving the error resilience of the input control format indicator. A QPSK modulation unit 112 performs QPSK modulation for the control format indicator error-correction-coded by the block encoding unit 111 in the QPSK modulation scheme, generates a modulation symbol, and outputs the modulation symbol to the multiplexing unit 160.

Each of the HARQ indicator channel processing units 120 performs baseband processing for transmitting the response information input from the control unit 11 in the OFDM scheme. That is, an iterative encoding unit 121 of the HARQ indicator channel processing unit 120 performs error correction coding by an iterative code for improving the error resilience of the input HARQ indicator channel. A BPSK modulation unit 122 BPSK-modulates data error-correction-coded by the iterative encoding unit 121 in a BPSK modulation scheme. A code multiplication unit 123 multiplies the BPSK-modulated response information by an orthogonal code, generates a modulation symbol, and outputs the modulation symbol to the multiplexing unit 160.

The broadcast channel processing unit 130 performs baseband processing for transmitting the system information input from the control unit 11 in the OFDM scheme. That is, a convolutional encoding unit 131 of the broadcast channel processing unit 130 performs error correction coding by a convolutional code for improving the error resilience of the input system information. A QPSK modulation unit 132 generates a modulation symbol by modulating the system information error-correction-coded by the convolutional encoding unit 131 of the broadcast channel processing unit 130 in the QPSK modulation scheme, and outputs the modulation symbol to the multiplexing unit 160.

Each of the downlink control channel processing units 140 performs baseband processing for transmitting the control data input from the control unit 11 in the OFDM scheme. That is, a convolutional encoding unit 141 of the downlink control channel processing unit 140 performs error correction coding by a convolutional code for improving the error resilience of the input system information. A QPSK modulation unit 142 generates a modulation symbol by modulating the control data error-correction-coded by the convolutional encoding unit 141 in the QPSK modulation, and outputs the modulation symbol to the multiplexing unit 160.

The downlink pilot channel generation unit 150 generates a downlink pilot symbol to be used in propagation channel estimation/propagation channel compensation of the downlink control channel, the downlink shared data channel, or the like transmitted by each transmission antenna of the base station device 1 on the downlink pilot channel, and outputs the downlink pilot symbol to the multiplexing unit 160.

Based on a control signal from the control unit 11, the multiplexing unit 160 arranges the modulation symbols of the data, control format indicator, the response information, the system information, and the control data processed by coding, modulation, and the like and output by the channel processing units, and the downlink pilot symbol in resource elements for each transmission antenna. Specific arrangement methods directed to resource elements of the downlink shared data channel, the control format indicator channel, the HARQ indicator channel, the broadcast channel, and the downlink control channel will be described later.

The IFFT unit 171 performs modulation of the OFDM scheme by performing IFFT for a signal in which the modulation symbols and the downlink pilot symbol are arranged in the resource elements for each transmission antenna by the multiplexing unit 160. The GI insertion unit 172 generates an OFDM symbol by adding a GI to the signal OFDM-modulated by the IFFT unit 171, and generates a baseband digital signal. The GI is obtained by a well-known method of copying part of a head or tail of a symbol to be transmitted. The D/A unit 173 converts the baseband digital signal input from the GI insertion unit 172 into an analog signal.

The transmission RF unit 174 generates an in-phase component and a quadrature component of an intermediate frequency from the analog signal input from the D/A unit 173, removes an extra frequency component for an intermediate frequency band, converts (up-converts) an intermediate frequency signal into a high frequency signal, removes an extra frequency component, amplifies power, and transmits the signal by outputting the signal to a corresponding transmission antenna. The base station device 1 includes the transmission antenna-specific transmission processing units 170 whose number corresponds to the number of transmission antennas to be used in transmission, for example, 4 transmission antenna-specific transmission processing units 170 in the present embodiment. Each of the transmission antenna-specific transmission processing units 170 processes a signal for a corresponding transmission antenna among signals for the transmission antennas output by the multiplexing unit 160.

Figure 7:
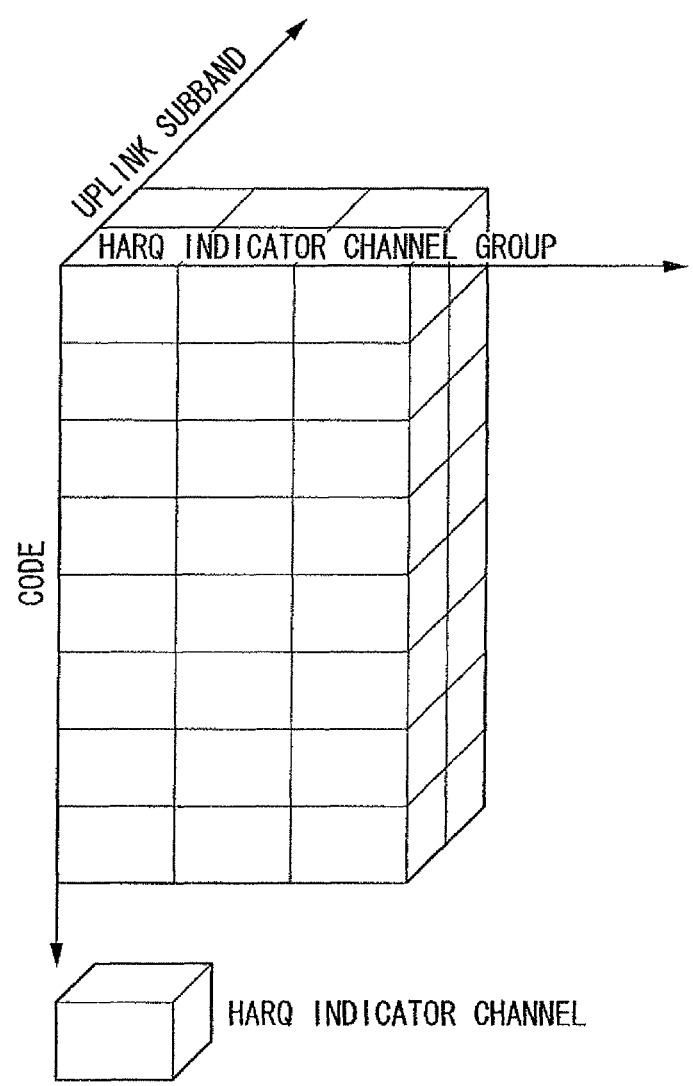
FIG. 7 is a diagram illustrating a method of code multiplexing by a multiplexing unit of FIG. 6.

FIG. 7 is a diagram illustrating a method of code-multiplexing HARQ indicator channels by the multiplexing unit 160 of FIG. 6. In FIG. 7, 8 HARQ indicator channels are code-multiplexed by an orthogonal code, and constitute an HARQ indicator channel group (response information group). If the base station device 1 receives the uplink shared data channel transmitted by the mobile station device 2, the HARQ indicator channel group to which the HARQ indicator channel on which response information to the uplink shared data channel is transmitted belongs and an orthogonal code used in code multiplexing are associated with a lowest-frequency PRB allocated to the uplink shared data channel.

A set of multiple HARQ indicator channel groups is referred to as an HARQ indicator channel group cluster (response information group). An example of the HARQ indicator channel group cluster is a set of HARQ indicator channel groups corresponding to multiple data arranged in the same subband of the uplink.

Figure 8:
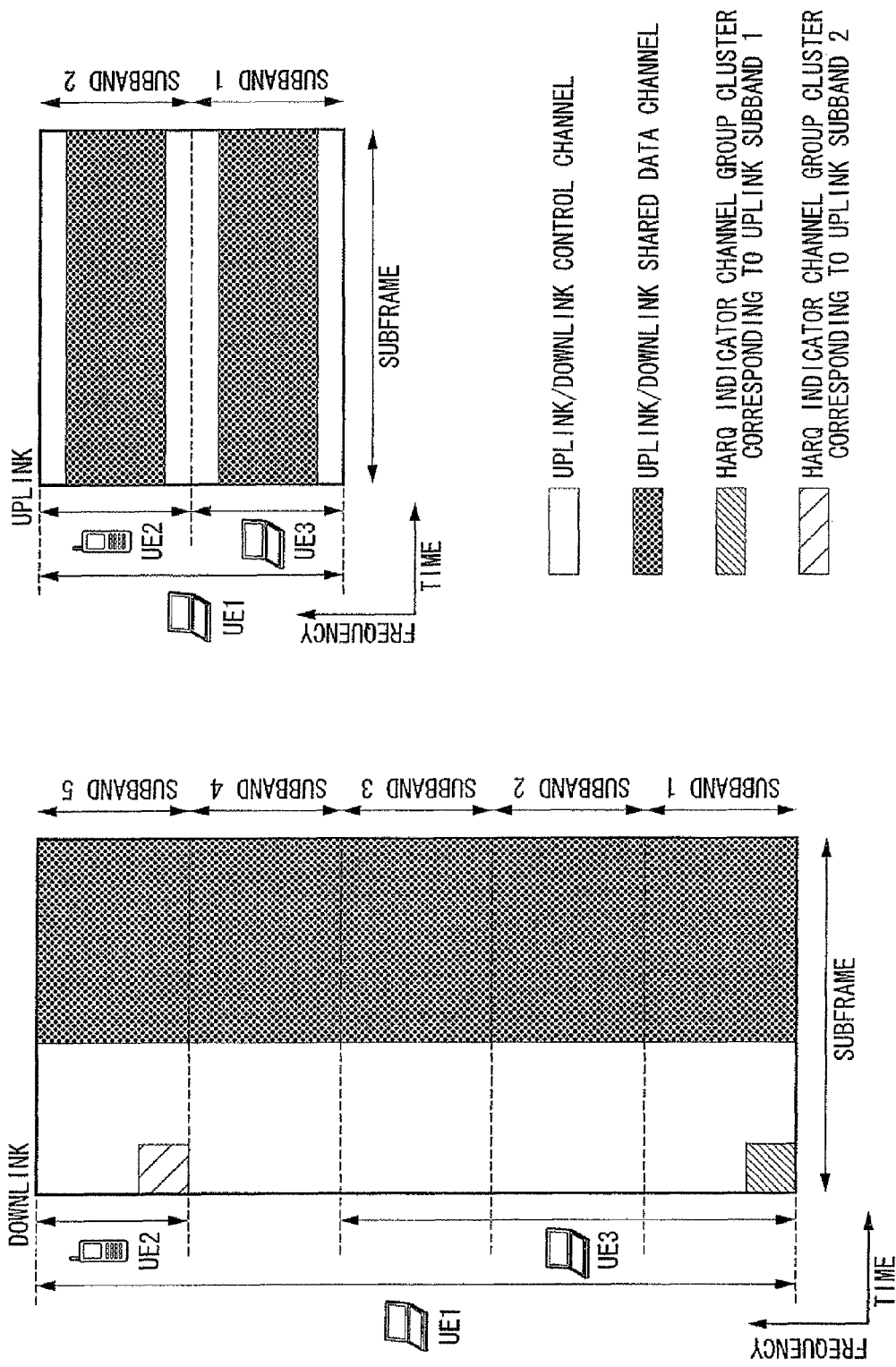
FIG. 8 is a diagram illustrating a method of arranging HARQ indicator channel group clusters by the multiplexing unit of FIG. 6.

FIG. 8 is a diagram illustrating a method of arranging HARQ indicator channel group clusters by the multiplexing unit 160 of FIG. 6. In FIG. 8, the horizontal axis is a time axis, the vertical axis is a frequency axis, a downlink system band includes 5 subbands, and an uplink system band includes 2 subbands. An HARQ indicator channel group cluster corresponding to an uplink subband 1 is arranged in the downlink subband 1, and an HARQ indicator channel group cluster corresponding to an uplink subband 2 is arranged in a downlink subband 5. That is, the HARQ indicator channel is allocated to a downlink subband in a unit of an HARQ indicator channel group cluster corresponding to an uplink subband. The HARQ indicator channel group cluster is arranged by frequency multiplexing with an OFDM symbol in which the downlink control channel is arranged, an uplink subband is allocated to the mobile station device 2, and also a downlink subband is allocated so that an HARQ indicator channel group cluster corresponding to the uplink subband can be received.

In FIG. 8, the mobile station device UE1 is allocated the subbands 1 and 2 in the uplink and subbands 1 to 5 in the downlink. The mobile station device UE1 can receive an HARQ indicator channel group cluster corresponding to the uplink subband 1 in the downlink subband 1 and receive an HARQ indicator channel group cluster corresponding to the uplink subband 2 in the downlink subband 5.

The mobile station device UE2 is allocated the subband 2 in the uplink and the subband 5 in the downlink. The mobile station device UE2 can receive an HARQ indicator channel group cluster corresponding to the uplink subband 2 in the downlink subband 5.

The mobile station device UE3 is allocated the subband 1 in the uplink and the subbands 1 to 3 in the downlink. The mobile station device UE3 can receive an HARQ indicator channel group cluster corresponding to the uplink subband 1 in the downlink subband 1.

Figure 9:
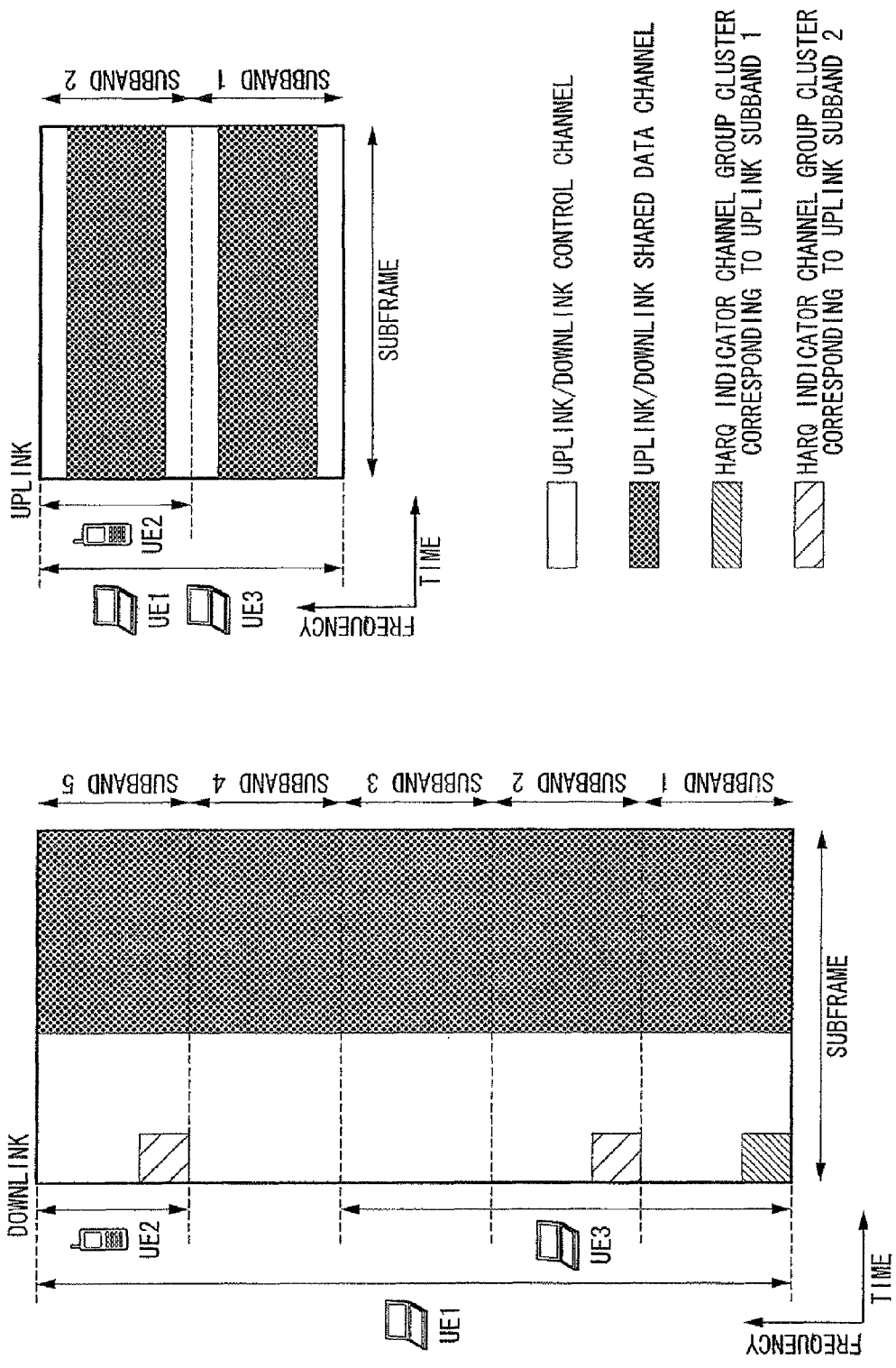
FIG. 9 is a diagram illustrating a method of regenerating and arranging an HARQ indicator channel group cluster.

The multiplexing unit 160 may regenerate an HARQ indicator channel group cluster and arrange a regeneration result in multiple downlink subbands. FIG. 9 is a diagram illustrating a method of regenerating and arranging an HARQ indicator channel group cluster. In FIG. 9, an HARQ indicator channel group cluster corresponding to the uplink subband 2 is regenerated and arranged in the downlink subband 2 in addition to the arrangement of HARQ indicator channel group clusters of FIG. 8. In an example shown in FIG. 9, an HARQ indicator channel group cluster corresponding to the uplink subband 1 is arranged in the downlink subband 1, and an HARQ indicator channel group cluster corresponding to the uplink subband 2 is arranged in the downlink subbands 2 and 5.

In FIG. 9, the mobile station device UE3 is allocated the subbands 1 and 2 in the uplink and the subbands 1 to 3 in the downlink. The mobile station device UE3 can receive an HARQ indicator channel group cluster corresponding to the uplink subband 1 in the downlink subband 1 and receive an HARQ indicator channel group cluster corresponding to the uplink subband 2 in the downlink subband 2.

Figure 10:
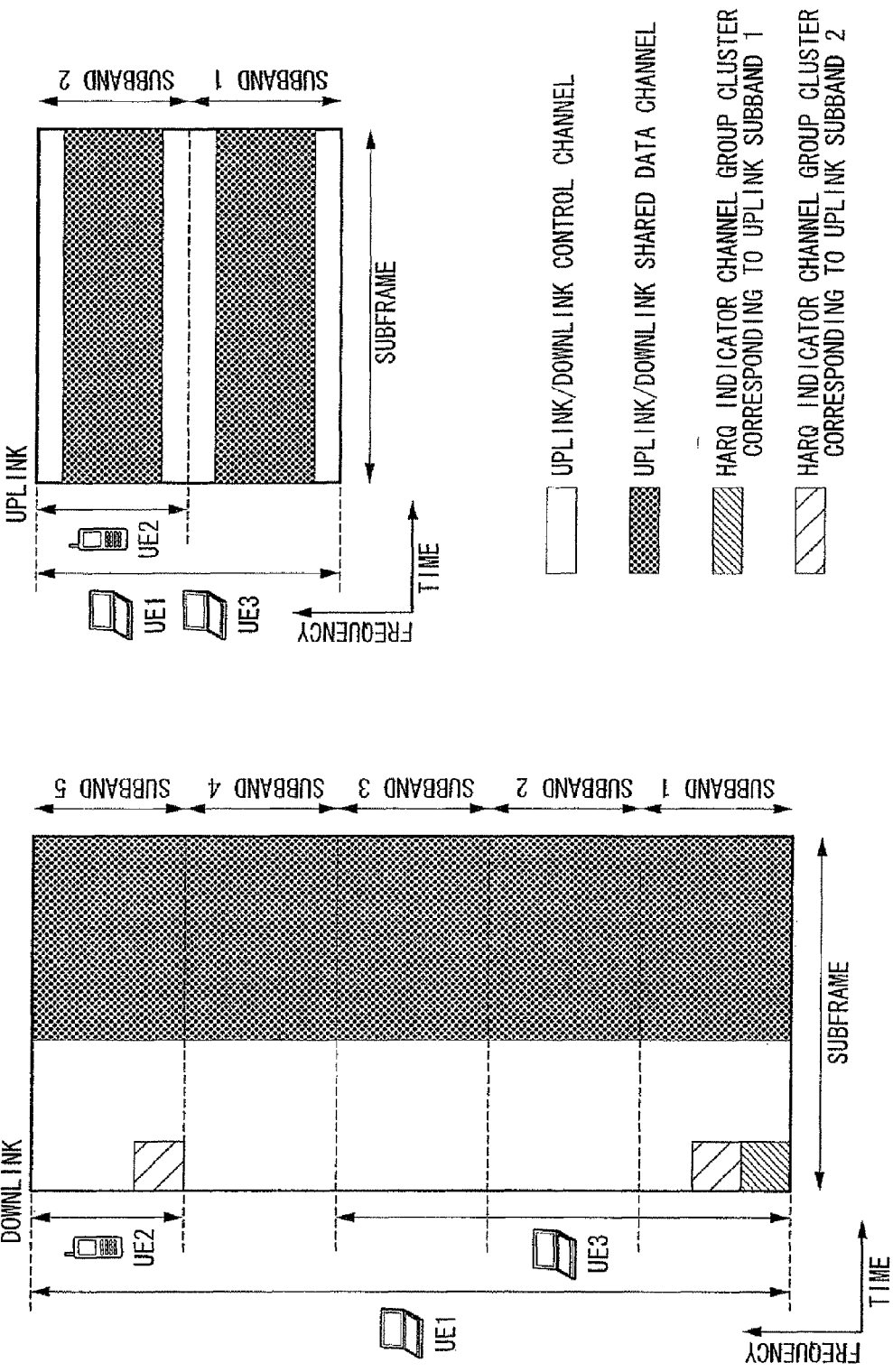
FIG. 10 is a diagram illustrating another method of regenerating and arranging an HARQ indicator channel group cluster.

The multiplexing unit 160 may arrange HARQ indicator channel group clusters corresponding to different uplink subbands in the same downlink subband. FIG. 10 is a diagram illustrating another method of regenerating and arranging an HARQ indicator channel group cluster. In FIG. 10, an HARQ indicator channel group cluster corresponding to the uplink subband 2 is regenerated and arranged in the downlink subband 1 in addition to the arrangement of HARQ indicator channel group clusters of FIG. 8. In an example shown in FIG. 10, an HARQ indicator channel group cluster corresponding to the uplink subband 1 and an HARQ indicator channel group cluster corresponding to the subband 2 are arranged in the downlink subband 1, and an HARQ indicator channel group cluster corresponding to the uplink subband 2 is arranged in the downlink subband 5.

In FIG. 10, the mobile station device UE3 is allocated the subbands 1 and 2 in the uplink and the subbands 1 to 3 in the downlink. The mobile station device UE3 can receive an HARQ indicator channel group cluster corresponding to the uplink subband 1 and an HARQ indicator channel group cluster corresponding to the uplink subband 2 in the downlink subband 1.

A method of regenerating and arranging an HARQ indicator channel group cluster has been described in FIGS. 9 and 10. However, an HARQ indicator channel group cluster may be constituted by only HARQ indicator channels for a mobile station device 2 capable of receiving a downlink subband in which an HARQ indicator channel group cluster is arranged. For example, in FIG. 9, an HARQ indicator channel group cluster corresponding to the uplink subband 2 arranged in the downlink subband 2 may constitute an HARQ indicator channel group and an HARQ indicator channel group cluster from HARQ indicator channels corresponding to multiple data arranged in the uplink subband 2 by multiple mobile station devices 2 such as the mobile station devices UE1 and UE3 capable of receiving the downlink subband 2. In other words, an HARQ indicator channel corresponding to data arranged in the uplink subband 2 by a mobile station device 2 incapable of receiving the downlink subband 2 such as the mobile station device UE2 is not included in the HARQ indicator channel group cluster of the downlink subband 2.

Figure 11:
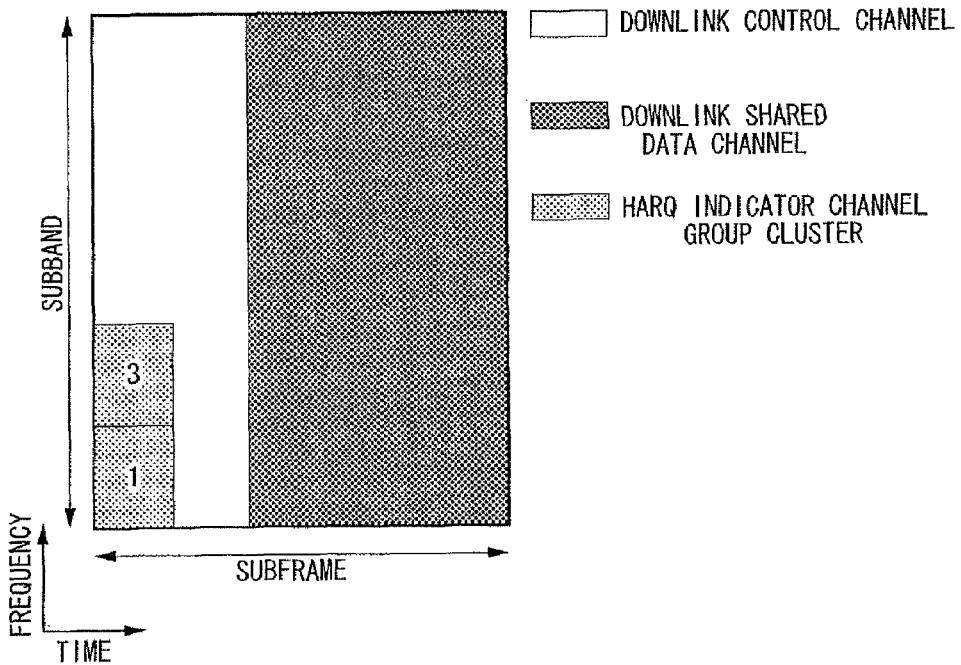
FIG. 11 is a diagram illustrating a method of arranging multiple HARQ indicator channel group clusters in 1 subband of a downlink.
Figure 12:
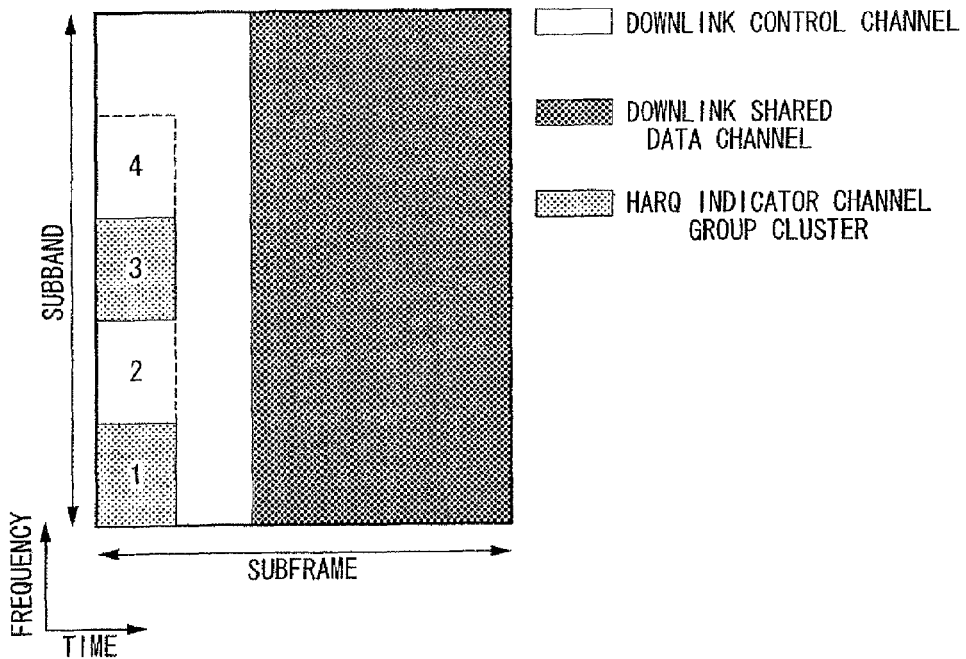
FIG. 12 is a diagram illustrating another method of arranging multiple HARQ indicator channel group clusters in 1 subband of the downlink.

FIGS. 11 and 12 are diagrams illustrating a method of arranging multiple HARQ indicator channel group clusters in one subband of the downlink. In FIGS. 11 and 12, the multiple HARQ indicator channel group clusters are arranged in one subband of the downlink. In FIGS. 11 and 12, the horizontal axis is a time axis, the vertical axis is a frequency axis. Only 1 subframe in the time domain and 1 subband in the frequency domain are shown, and only the downlink control channel, the downlink shared data channel, and the HARQ indicator channel group clusters are shown for simplification of description. FIGS. 11 and 12 are examples in which it is assumed that 4 uplink subbands exist, and two of an HARQ indicator channel group cluster corresponding to an uplink subband 1 and an HARQ indicator channel group cluster corresponding to a subband 3 are arranged in 1 subband of the downlink.

FIGS. 11 and 12 are examples in which HARQ indicator channel group clusters corresponding to subbands of the uplink are continuously arranged in the frequency direction in ascending order of corresponding uplink subband numbers. In FIG. 11, the HARQ indicator channel group cluster corresponding to the uplink subband 1 is arranged from a predetermined position as a position where the HARQ indicator channel group cluster is arranged, for example, a lower frequency of a first OFDM symbol, and the HARQ indicator channel group cluster corresponding to the uplink subband 3 is arranged at a subsequent frequency. That is, the HARQ indicator channel group clusters to be arranged actually are continuously arranged in the frequency direction in ascending order of corresponding uplink subband numbers.

In FIG. 12, the HARQ indicator channel group cluster corresponding to the uplink subband 1 is arranged from a predetermined position as a position where the HARQ indicator channel group cluster corresponding to the uplink subband 1 is arranged, for example, a lower frequency of a first OFDM symbol, and the HARQ indicator channel group cluster corresponding to uplink subband 3 is arranged in a predetermined position as a position where the HARQ indicator channel group cluster corresponding to the subband 3 is arranged. That is, positions where HARQ indicator channel group clusters corresponding to the 4 subbands of the uplink are arranged are predetermined, and the HARQ indicator channel group clusters to be arranged actually are arranged in the corresponding positions.

At this time, other channels such as the downlink control channel and the like may be reused in resource elements reserved to arrange the HARQ indicator channel group clusters corresponding to the uplink subbands 2 and 4.

A method of arranging a signal in a unit of an HARQ indicator channel group cluster, which is a set of HARQ indicator channel groups, has been described above, but a signal may be arranged in a unit of an HARQ indicator channel group.

Figure 13:
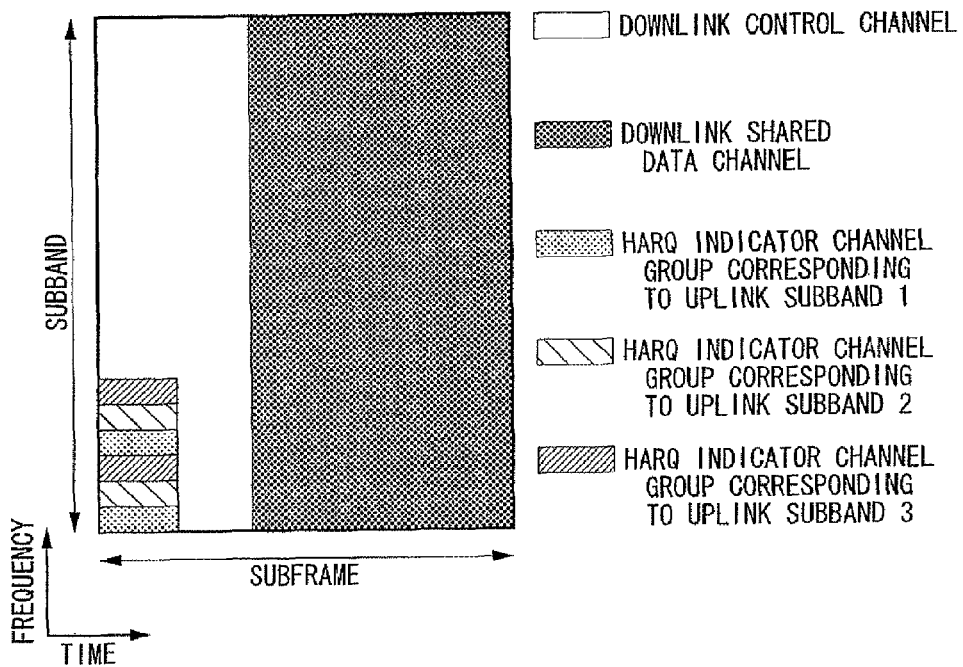
FIG. 13 is a diagram illustrating a method of continuously arranging HARQ indicator channel groups in a frequency direction.
Figure 14:
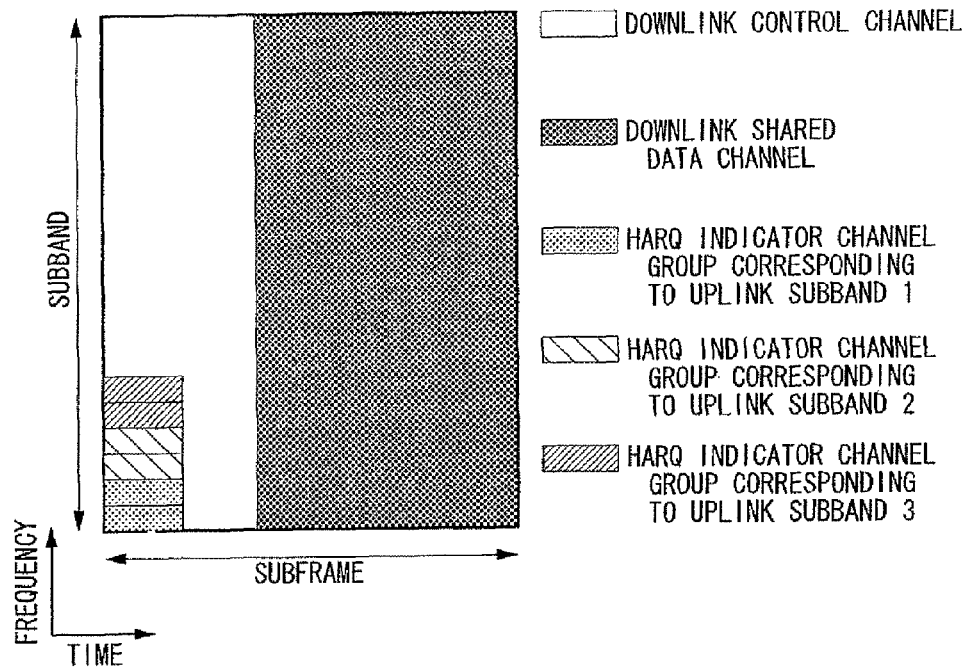
FIG. 14 is a diagram illustrating another method of continuously arranging HARQ indicator channel groups in the frequency direction.

FIGS. 13 and 14 are diagrams illustrating a method of continuously arranging HARQ indicator channel groups in the frequency direction. In FIGS. 13 and 14, the horizontal axis is a time axis, the vertical axis is a frequency axis. Only 1 subframe in the time domain and 1 subband in the frequency domain are shown, and only the downlink control channel, the downlink shared data channel, and the HARQ indicator channel groups are shown for simplification of description. FIGS. 13 and 14 are examples in which it is assumed that 3 uplink subbands exist and an HARQ indicator channel group cluster corresponding to each uplink subband includes 2 HARQ indicator channel groups, and three of an HARQ indicator channel group cluster corresponding to an uplink subband 1, an HARQ indicator channel group cluster corresponding to an uplink subband 2, and an HARQ indicator channel group cluster corresponding to a subband 3 are arranged in a downlink subband.

In order from a lower frequency of a first OFDM symbol of a subframe in FIG. 13, a first HARQ indicator channel group corresponding to the uplink subband 1 is arranged, a first HARQ indicator channel group corresponding to the next uplink subband 2 is arranged, and a first HARQ indicator channel group corresponding to the next uplink subband 3 is arranged. If all the first HARQ indicator channel groups corresponding to the subbands of the uplink are arranged as described above, second HARQ indicator channel groups corresponding to the uplink subbands are also arranged in the same manner. That is, HARQ indicator channel groups corresponding to different uplink subbands are alternately arranged.

In order from a lower frequency of a first OFDM symbol of a subframe in FIG. 14, a continuous arrangement from a first HARQ indicator channel group to a second HARQ indicator channel group corresponding to the uplink subband 1 is made, an arrangement from a first HARQ indicator channel group to a second HARQ indicator channel group corresponding to the next uplink subband 2 is made, and an arrangement from a first HARQ indicator channel group to a second HARQ indicator channel group corresponding to the last uplink subband 3 is made. That is, HARQ indicator channel groups corresponding to the same uplink subband are centrally arranged.

Accordingly, if a method of arranging an HARQ indicator channel group is predetermined and the mobile station device 2 stores the arrangement method, the mobile station device 2 can recognize a position where a desired HARQ indicator channel group is arranged from the number of HARQ indicator channel group clusters included in the downlink subband.

In the present embodiment, an HARQ indicator channel is multiplied by an orthogonal code after performing iterative coding that iterates a bit having the same value as that of an input bit multiple times, and is code-multiplexed. For 1 HARQ indicator channel, a signal group (hereinafter, referred to as an "HARQ indicator channel component") having the same length as an orthogonal code sequence length is iterated multiple times. Multiple HARQ indicator channel components are distributed and arranged in the frequency direction.

Figure 15:
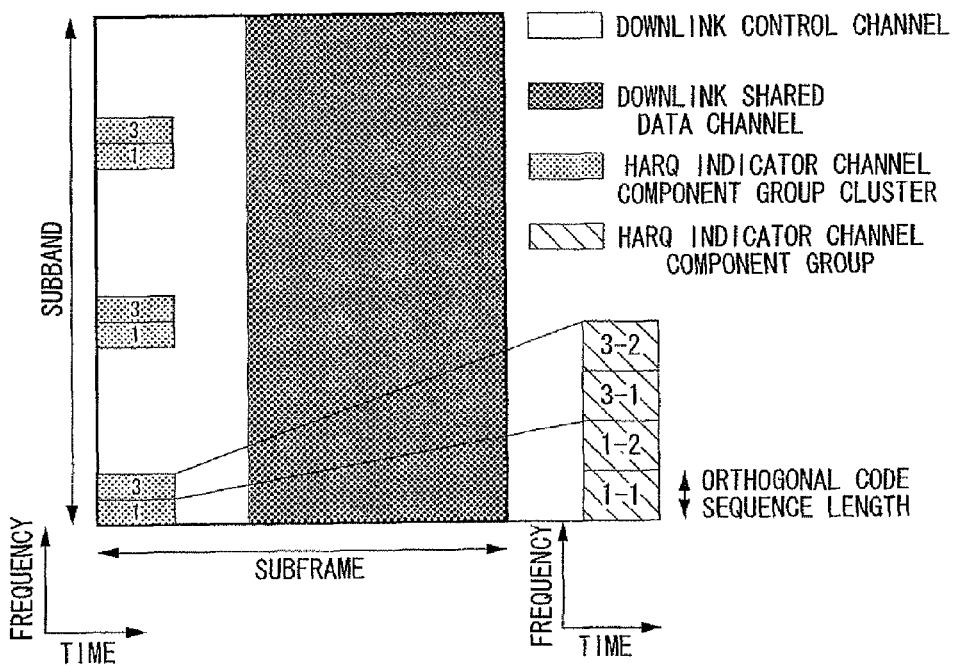
FIG. 15 is a diagram illustrating a method of distributing and arranging multiple HARQ indicator channel components constituting an HARQ indicator channel in the frequency direction.

FIG. 15 is a diagram illustrating a method of distributing and arranging multiple HARQ indicator channel components constituting an HARQ indicator channel in the frequency direction. In FIG. 15, multiple HARQ indicator channel components constituting 1 HARQ indicator channel in FIG. 11 are distributed and arranged. In FIG. 15, the horizontal axis is a time axis, the vertical axis is a frequency axis. Only 1 subframe in the time domain and 1 subband in the frequency domain are shown, and only the downlink control channel, the downlink shared data channel, and the HARQ indicator channel group cluster are shown for simplification of description. FIG. 15 is an example in which an HARQ indicator channel group cluster corresponding to an uplink subband 1 and an HARQ indicator channel group cluster corresponding to an uplink subband 3 are arranged in a downlink subband, an HARQ indicator channel group cluster corresponding to each uplink subband includes 2 HARQ indicator channel groups, and each HARQ indicator channel of the HARQ indicator channel group includes 3 HARQ indicator channel components.

In FIG. 15, a rectangle "1-1" indicates a thing (hereinafter, referred to as an "HARQ indicator channel component group") obtained by code-multiplexing HARQ indicator channel components constituting HARQ indicator channels constituting an HARQ indicator channel group 1 corresponding to the uplink subband 1, and a rectangle "1-2" indicates an HARQ indicator channel component group obtained by code-multiplexing HARQ indicator channel components constituting HARQ indicator channels constituting an HARQ indicator channel group 2 corresponding to the uplink subband 1. The same applies to rectangles "3-1" and "3-2". Unities of rectangles "1" and "3" indicate those (hereinafter, referred to as "HARQ indicator channel component group clusters) including HARQ indicator channel component groups corresponding to uplink subbands 1 and 3 iteratively arranged. That is, in FIG. 15, 6 HARQ indicator channel component group clusters exist in the subband, each HARQ indicator channel component group cluster includes 2 HARQ indicator channel component groups, and each HARQ indicator channel component group includes multiple HARQ indicator channel components.

In the example of FIG. 15, 3 HARQ indicator channel component group clusters are arranged in separated positions in the frequency direction. HARQ indicator channel component groups of an HARQ indicator channel group cluster of the uplink subband 1 as a first HARQ indicator channel component group cluster are arranged one by one in order from a lower frequency of a first OFDM symbol. Next, HARQ indicator channel component groups of an HARQ indicator channel group cluster of the uplink subband 3 are sequentially arranged one by one to be continuous in the frequency direction.

In addition, a second HARQ indicator channel component group cluster is arranged in a position separated from a frequency at which the first HARQ indicator channel component group cluster is arranged in the same manner. In addition, a third HARQ indicator channel component group cluster is arranged in a position separated from a frequency at which the second HARQ indicator channel component group cluster is arranged in the same manner.

Figure 16:
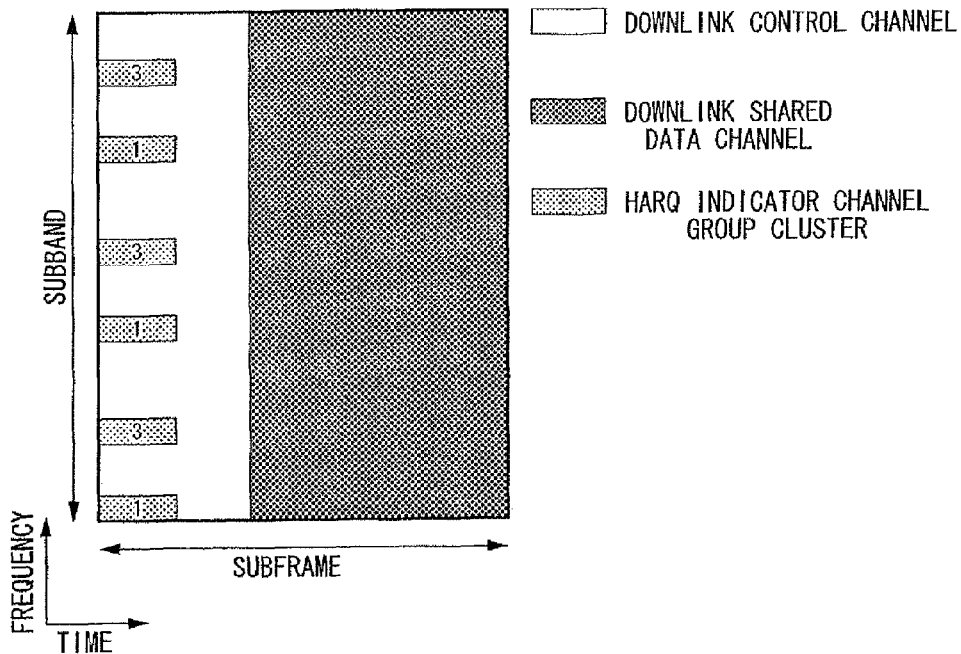
FIG. 16 is a diagram illustrating a method of distributing and arranging HARQ indicator channel component group clusters having the same ordinal number in HARQ indicator channel group clusters of uplink subbands for FIG. 15.

FIG. 16 is a diagram illustrating a method of distributing and arranging HARQ indicator channel component group clusters having the same ordinal number in HARQ indicator channel group clusters of uplink subbands for FIG. 15. In FIG. 16, the HARQ indicator channel component group clusters having the same ordinal number in the HARQ indicator channel group clusters of the uplink subbands are not continuous in the frequency direction, but are distributed and arranged. This is the same meaning that the HARQ indicator channel group clusters of the uplink subbands are distributed and arranged in the frequency direction.

In order to receive an HARQ indicator channel, the mobile station device 2 needs to recognize an arrangement of an HARQ indicator channel group cluster and a type of HARQ indicator channel group cluster, that is, an uplink subband number corresponding to the HARQ indicator channel group cluster. Here, the base station device 1 transmits HARQ indicator channel setting information including information indicating the number of HARQ indicator channel group clusters arranged in each subband of the downlink and information (a corresponding uplink subband number) indicating which uplink subband is for an arranged HARQ indicator channel group cluster to the mobile station device 2. In the present embodiment, the HARQ indicator channel setting information is arranged in each downlink subband.

In FIG. 9, since the maximum number of HARQ indicator channel group clusters (2) capable of corresponding to 2 bits for indicating the number of arranged HARQ indicator channel group clusters (from 0 to 2) and 1 bit for indicating the uplink subband 1 or 2 corresponding to the arranged HARQ indicator channel group cluster is necessary, a total of 4 bits is necessary for each downlink subband (a full flexible arrangement in which there is a degree of freedom in both associations with the number of arranged HARQ indicator channel group clusters and the uplink subband).

Figures 17, 18:
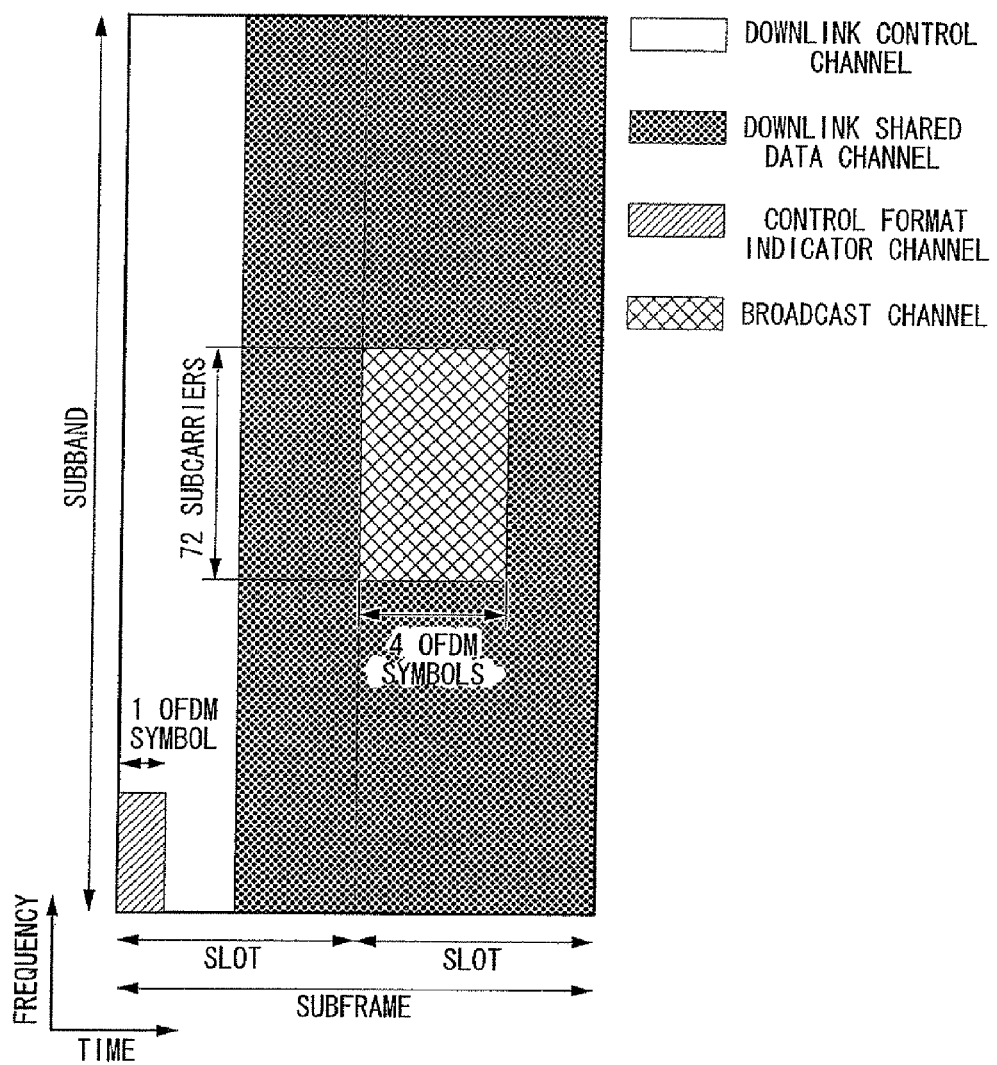
FIG. 17 is a diagram illustrating information that is set to HARQ indicator channel setting information.
FIG. 18 is a diagram illustrating an arrangement of each channel on which the HARQ indicator channel setting information is transmitted.

FIG. 17 is a diagram illustrating information that is set to HARQ indicator channel setting information. In FIG. 17, a bit sequence of the HARQ indicator channel setting information is associated with the number of HARQ indicator channel group clusters arranged in 1 downlink subband and information regarding which uplink subframe number corresponds to an HARQ indicator channel group cluster. The mobile station device 2 stores, in advance, the association of the table of FIG. 17. The number of bits of the HARQ indicator channel setting information can be reduced if the HARQ indicator channel setting information is referred to. In FIG. 17, the HARQ indicator channel setting information is 3 bits.

Information necessary for the HARQ indicator channel setting information can be reduced by limiting the number of HARQ indicator channel group clusters capable of being arranged in the downlink subband to 1 or the like although a degree of freedom in arrangement of the HARQ indicator channel group clusters is low (a semi flexible arrangement in which there is a degree of freedom only in the association with the uplink subband).

The HARQ indicator channel setting information is transmitted using any one channel of the broadcast channel or the control format indicator channel in which a position to be arranged is predetermined and the downlink shared data channel in which an arrangement is indicated by the downlink control channel.

FIG. 18 is a diagram illustrating an arrangement of each channel on which the HARQ indicator channel setting information is transmitted. In FIG. 18, the horizontal axis is a time axis, the vertical axis is a frequency axis, and only 1 subframe in the time domain and 1 subband in the frequency domain are shown. The same channel arrangement is made even in other subbands.

The broadcast channel is arranged in 72 subcarriers of the center in the frequency domain and first to fourth OFDM symbols of a second slot of the subframe in the time domain in every fixed cycle, for example, every 40 subframes. The control format indicator channel is transmitted in a predetermined frequency-domain position of a first OFDM symbol of the subframe in every subframe. The downlink shared data channel is arranged in each subframe, but system information including the HARQ indicator channel setting information is transmitted on the downlink shared data channel in every fixed cycle, for example, every 40 subframes, and an arrangement of the system information within the downlink shared data channel is indicated by the downlink control channel.

Figure 19:
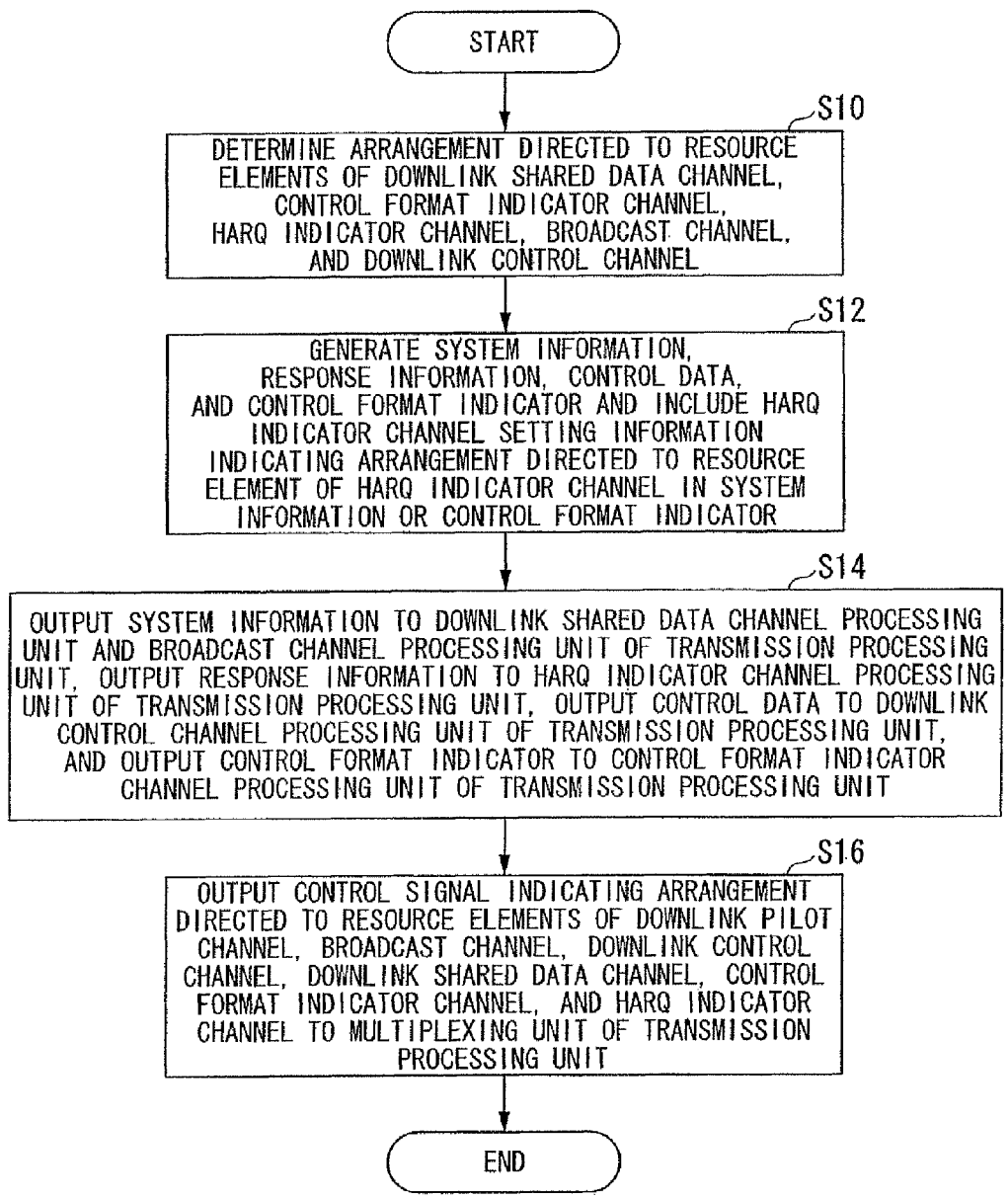
FIG. 19 is a flowchart illustrating an operation of controlling a transmission processing unit by a control unit of the base station device of FIG. 5.

FIG. 19 is a flowchart illustrating an operation of controlling the transmission processing unit 13 by the control unit 11 of the base station device 1 of FIG. 5. First, the control unit 11 determines an arrangement directed to resource elements of the downlink shared data channel, the control format indicator channel, the HARQ indicator channel, the broadcast channel, and the downlink control channel directed to resource elements of a subframe of a current processing target (S10).

Next, the control unit 11 generates system information, response information, control data, and a control format indicator. At this time, HARQ indicator channel setting information indicating an arrangement directed to a resource element of the HARQ indicator channel is included in the system information or the control format indicator (S12).

Next, the control unit 11 outputs the system information to the downlink shared data channel processing unit 100 and the broadcast channel processing unit 130 of the transmission processing unit 13, outputs the response information to the HARQ indicator channel processing unit 120 of the transmission processing unit 13, outputs the control data to the downlink control channel processing unit 140 of the transmission processing unit 13, and outputs the control format indicator to the control format indicator channel processing unit 110 of the transmission processing unit 13 (S14).

Next, the control unit 11 outputs a control signal, which gives an instruction for an arrangement directed to resource elements of the downlink pilot channel, the broadcast channel, the downlink shared data channel, the control format indicator channel, and the HARQ indicator channel, to the multiplexing unit 160 of the transmission processing unit 13 (S16).

The mobile station device 2 of the present embodiment extracts and demodulates/decodes the HARQ indicator channel according to the HARQ indicator channel setting information transmitted in each downlink subband from the base station device 1. If the HARQ indicator channel is regenerated and multiple identical HARQ indicator channels are transmitted, decoding is performed using all the multiple regenerated HARQ indicator channels.

Figure 20:
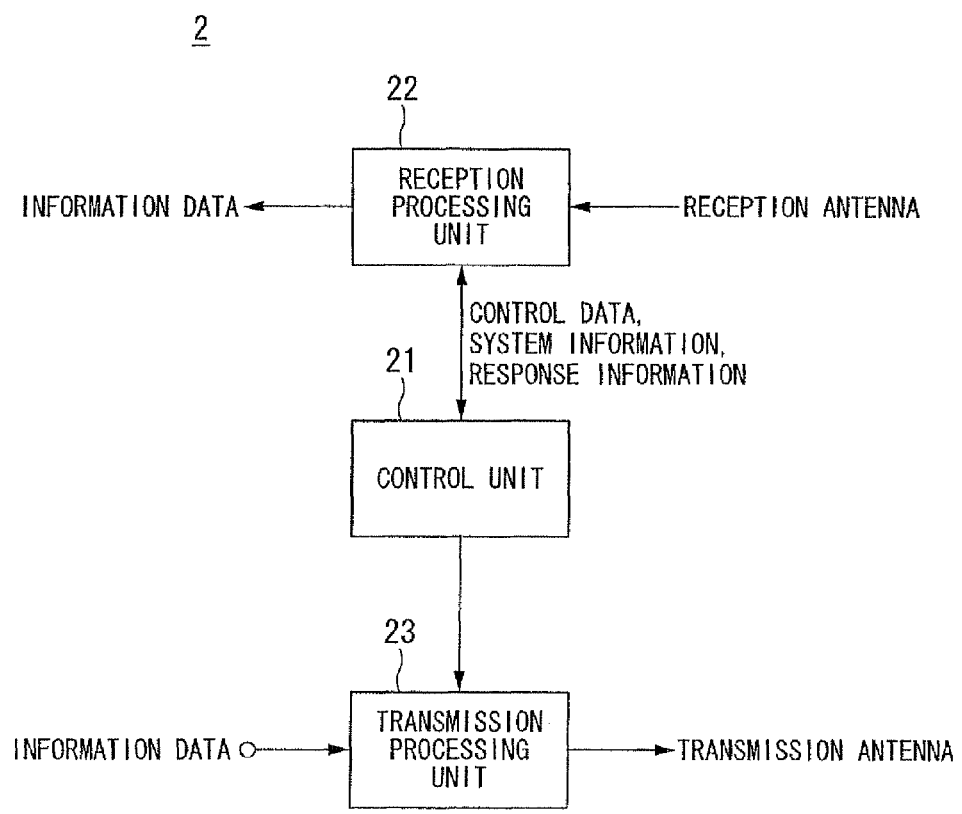
FIG. 20 is a schematic block diagram showing a configuration of a mobile station device according to the present embodiment.

FIG. 20 is a schematic block diagram showing a configuration of the mobile station device 2 according to the present embodiment. As shown in FIG. 20, the mobile station device 2 has a control unit 21, a reception processing unit 22, and a transmission processing unit 23. The reception processing unit 22 performs reception processing for the downlink control channel, the downlink shared data channel, the downlink pilot channel, the control format indicator channel, the broadcast channel, and the HARQ indicator channel received from the base station device 1 via a reception antenna, and outputs information data detected by the reception processing to the outside. Also, the reception processing unit 22 outputs control data reported using the downlink control channel, system information reported using the downlink shared data channel and the broadcast channel, a control format indicator reported using the control format indicator channel, and response information reported using the HARQ indicator channel to the control unit 21.

The control unit 21 controls the reception processing unit 23 and the reception processing unit 22 based on the control data reported using the downlink control channel, the system information reported using the downlink shared data channel and the broadcast channel, the control format indicator reported using the control format indicator channel, and the response information reported using the HARQ indicator channel from the base station device 1.

Also, the control unit 21 recognizes a resource element in which the HARQ indicator channel is arranged and an uplink subband corresponding to the response information included in the HARQ indicator channel from the HARQ indicator channel setting information, further recognizes an HARQ indicator channel group into which the HARQ indicator channel addressed to its own mobile station device and an orthogonal code by which the HARQ indicator channel addressed to its own mobile station device is multiplied in the base station device 1 from a lowest-frequency PRB used by the transmission processing unit 23 to transmit the uplink shared data channel, controls a demultiplexing unit 260 (to be described later) of the reception processing unit 22 to extract the HARQ indicator channel group, and controls a code multiplication unit 223 (to be described later) of the reception processing unit 22 to multiply the orthogonal code.

The transmission processing unit 23 transmits the information data input from the outside and the control data input from the control unit 21 via a transmission antenna with use of the uplink control channel, the uplink shared data channel, and the uplink pilot channel based on an input from the control unit 21.

Figure 21:
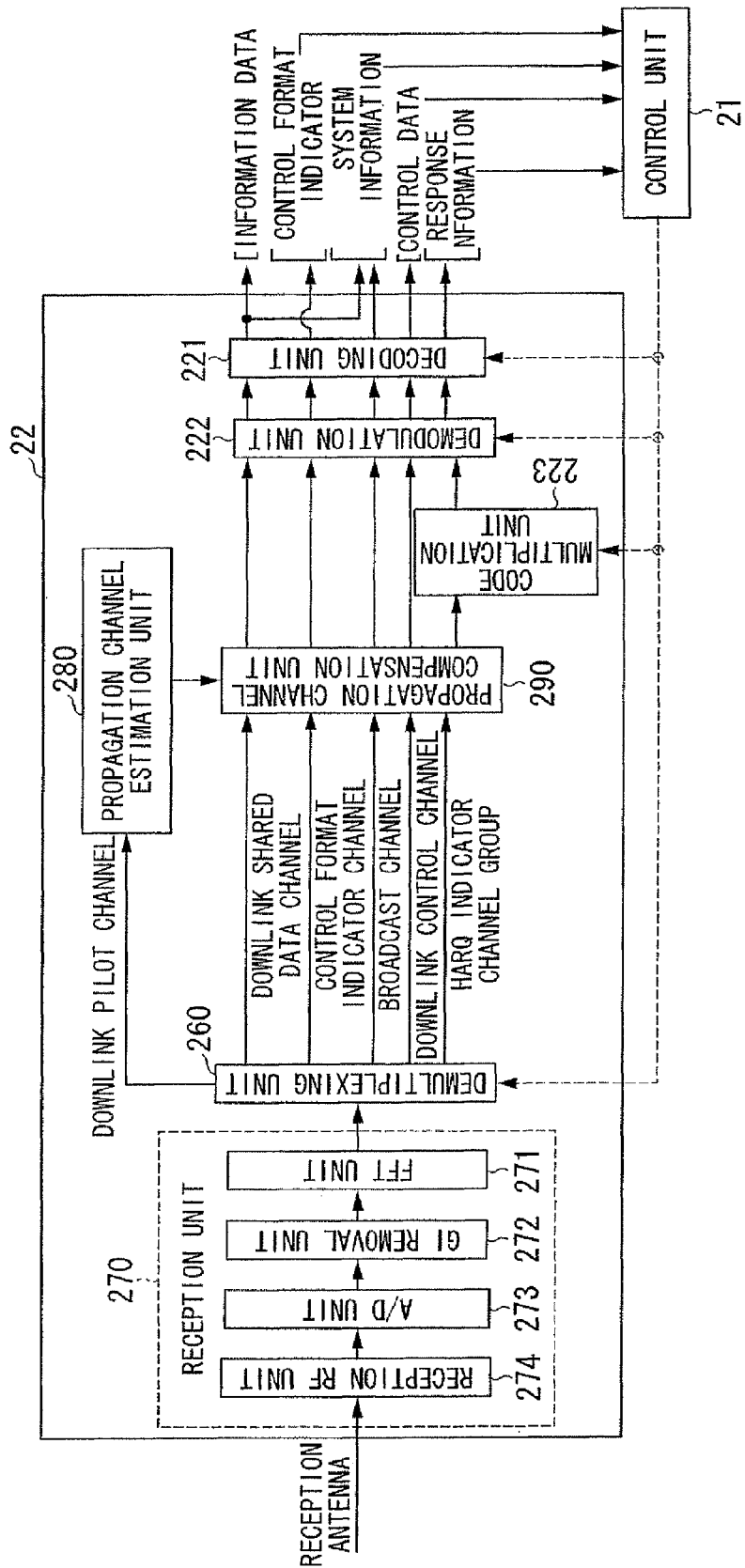
FIG. 21 is a schematic block diagram showing an internal configuration of a reception processing unit of the mobile station device of FIG. 20.

FIG. 21 is a schematic block diagram showing an internal configuration of the reception processing unit 22 of the mobile station device 2 of FIG. 20. The reception processing unit 22 of the mobile station device 2 includes a reception unit 270 including a reception RF unit 274, an A/D (analog to digital) conversion unit 273, a GI removal unit 272, and an FFT unit 271, the demultiplexing unit 260, a propagation channel estimation unit 280, a propagation channel compensation unit 290, a demodulation unit 222, a decoding unit 221, and the code multiplication unit 223. In the present embodiment, the reception RF unit 274, the A/D unit 273, the GI removal unit 272, and the FFT unit 271 function as the reception unit 270.

The reception RF unit 274 amplifies a signal received via a reception antenna, converts (down-converts) the amplified signal into an intermediate frequency, removes an unnecessary frequency component, controls an amplification level so that a signal level is appropriately maintained, and performs quadrature demodulation based on an in-phase component and a quadrature component of the received signal. The A/D unit 273 converts an analog signal quadrature-demodulated by the reception RF unit 274 into a digital signal. The GI removal unit 272 removes a part corresponding to a GI from the digital signal output by the A/D unit 273. The FFT unit 271 performs FFT for a signal input from the GI removal unit 272 and performs demodulation of the OFDM scheme.

Based on an instruction from the control unit 21, the demultiplexing unit 260 extracts and outputs the downlink pilot channel, the downlink shared data channel, the control format indicator channel, the broadcast channel, the downlink control channel, and the HARQ indicator channel group from arranged resource elements from the signal for which FFT is performed by the FFT unit 271, that is, the received signal demodulated by the OFDM scheme.

Specifically, the demultiplexing unit 260 extracts the downlink pilot channel, the control format indicator channel, and the broadcast channel having a fixed arrangement, outputs the downlink pilot channel to the propagation channel estimation unit 280, and outputs the control format indicator channel and the broadcast channel to the propagation channel compensation unit 290.

A procedure of extracting an HARQ indicator channel group from the downlink shared data channel and the downlink control channel is different by (1) the transmission of HARQ indicator setting information on the control format indicator channel or the broadcast channel having the fixed arrangement, or (2) the transmission of HARQ indicator channel setting information on the downlink shared data channel in which an arrangement is indicated by the downlink control channel.

(1) If the HARQ indicator channel setting information is included in the control format indicator channel or the broadcast channel, the demultiplexing unit 260 further extracts the HARQ indicator channel group including response information addressed to its own mobile station device based on the HARQ indicator channel setting information input via the control unit 21, and outputs the HARQ indicator channel group to the code multiplication unit 223. In addition, the demultiplexing unit 260 extracts the downlink control channel based on the control format indicator and the HARQ indicator channel setting information included in the control format indicator channel previously output to the propagation channel compensation unit 290 input via the control unit 21, and outputs the downlink control channel to the propagation compensation unit 290. In addition, the demultiplexing unit 260 extracts the downlink shared data channel based on radio resource allocation information included in the downlink control channel previously output to the propagation channel compensation unit 290 input via the control unit 21, and outputs the downlink shared data channel to the propagation channel compensation unit 290.

(2) If the HARQ indicator channel setting information is included in the downlink shared data channel, the demultiplexing unit 260 further extracts the downlink control channel based on the control format indicator included in the control format indicator channel previously output to the propagation channel compensation unit 290 input via the control unit 21, and outputs the downlink control channel to the propagation channel compensation unit 290. Since the HARQ indicator channel and the downlink control channel are frequency-multiplexed, the downlink control channel is incapable of being properly decoded without recognizing an arrangement of the HARQ indicator channel, so that the downlink control channel is decoded until decoding succeeds by assuming all possible HARQ indicator channel arrangements. In addition, if the downlink control channel is successfully decoded, the demultiplexing unit 260 extracts the system information included in the downlink shared data channel based on radio resource allocation information included in the downlink control channel previously output to the propagation channel compensation unit 290 input via the control unit 21, and outputs the system information to the propagation channel compensation unit 290.

In addition, the demultiplexing unit 260 extracts the HARQ indicator channel group including the response information addressed to its own mobile station device based on the HARQ indicator channel setting information transmitted in the system information included in the downlink shared data channel previously output to the propagation channel compensation unit 290 input via the control unit 21, and outputs the HARQ indicator channel group to the code multiplication unit 223.

The propagation channel estimation unit 280 estimates the propagation channel fluctuation for each of transmission antennas of the base station device 1 based on a reception result of the downlink pilot channel separated by the demultiplexing unit 260, and outputs a propagation channel fluctuation compensation value. The propagation channel compensation unit 290 compensates for the propagation channel fluctuation of a signal of the downlink shared data channel, the control format indicator channel, the broadcast channel, the downlink control channel, and the HARQ indicator channel group input from the demultiplexing unit 260 based on the propagation channel fluctuation compensation value from the propagation channel compensation unit 290.

Based on a control signal from the control unit 21, the code multiplication unit 223 multiplies the HARQ indicator channel group input from the demultiplexing unit 260 by the same orthogonal code as an orthogonal code multiplied by the HARQ indicator channel addressed to its own mobile station device by the code multiplication unit 123, extracts the HARQ indicator channel addressed to its own mobile station device, and outputs the HARQ indicator channel to the demodulation unit 222.

The demodulation unit 222 demodulates the downlink shared data channel, the control format indicator channel, the broadcast channel, and the downlink control channel of which the propagation channel fluctuation is compensated for by the propagation channel compensation unit 290 and the HARQ indicator channel extracted by the code multiplication unit 223 from the HARQ indicator channel group. This demodulation is performed in correspondence with a modulation scheme used in the data modulation unit 102, the three QPSK modulation units (the QPSK modulation units 112, 132, and 142), and the BPSK modulation unit 122, and a modulation scheme of the downlink shared data channel is indicated from the control unit 21 based on information included in the downlink control channel.

The decoding unit 221 decodes the downlink shared data channel, the control format indicator channel, the broadcast channel, the downlink control channel, and the HARQ indicator channel demodulated by the demodulation unit 222. This decoding is performed in correspondence with a code and a coding rate used in the turbo encoding unit 101, the block encoding unit 111, the iterative encoding unit 121, and the two convolutional encoding units (the convolutional encoding units 131 and 141) of the base station device 1, and a coding rate of the downlink shared data channel is indicated from the control unit 21 based on information included in the downlink control channel.

The system information included in the downlink shared data channel, the system information included in the broadcast channel, the control format indicator included in the control format indicator channel, the control data included in the downlink control channel, and the response information included in the HARQ indicator channel decoded by the decoding unit 221 are input to the control unit 21.

When multiple regenerated HARQ indicator channels are input, the decoding unit 221, (a) performs decoding by combining all powers (signals) of multiple HARQ indicator channels, (b) performs decoding by comparing the powers of the multiple HARQ indicator channels and selecting an HARQ indicator channel having the highest power, or (c) performs decoding by comparing powers of downlink pilot channels included in a downlink subband and selecting an HARQ indicator channel transmitted in the same downlink subband as that of a downlink pilot channel having the highest power.

Figure 22:
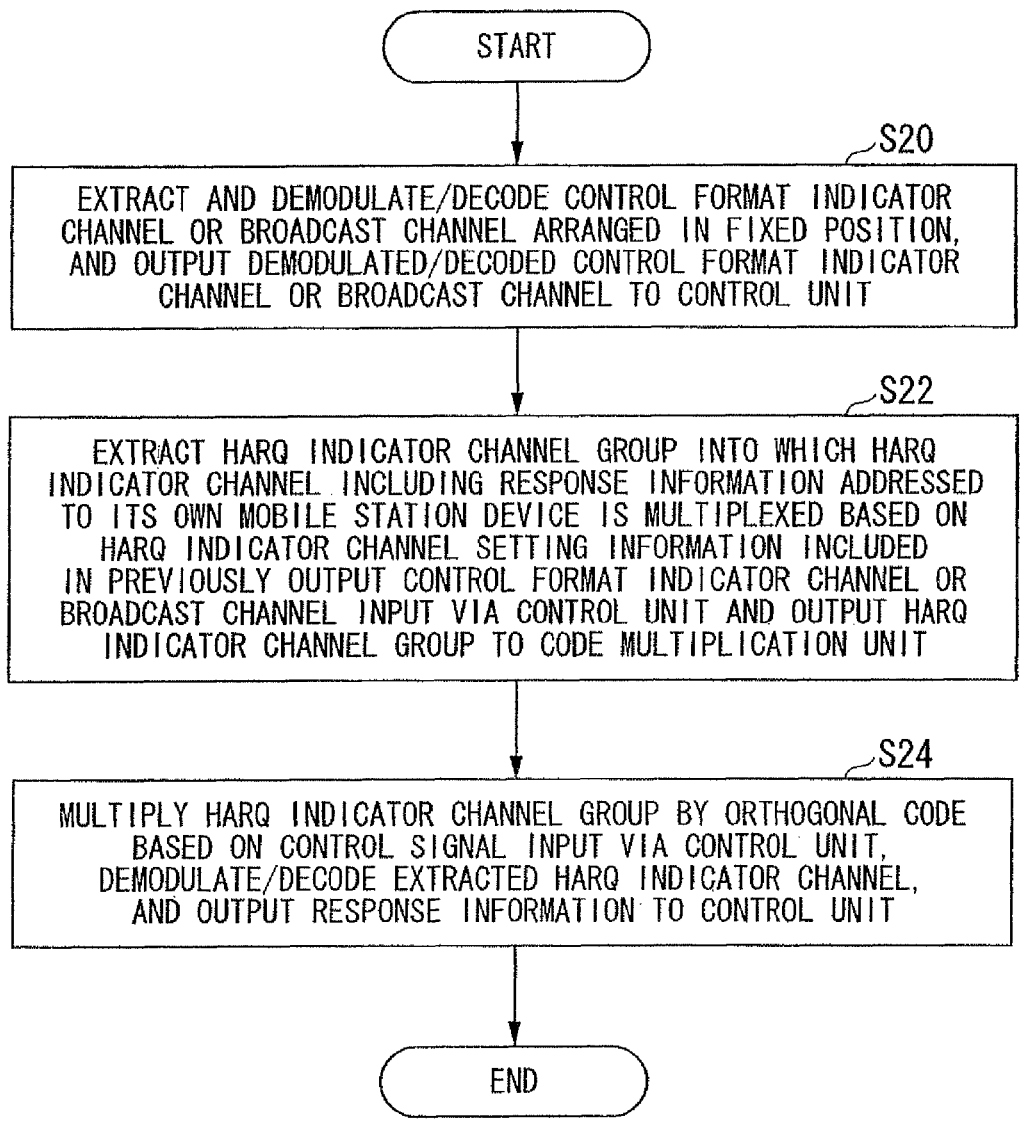
FIG. 22 is a flowchart illustrating an operation of receiving an HARQ indicator channel by the reception processing unit of the mobile station device of FIG. 20.

FIG. 22 is a flowchart illustrating an operation of receiving an HARQ indicator channel by the reception processing unit 22 of the mobile station device 2 of FIG. 20. The flowchart of FIG. 22 is the reception operation by the reception processing unit 22 when the HARQ indicator channel setting information is included in the system information of the control format indicator or the broadcast channel.

First, the reception processing unit 22 extracts and demodulates/decodes the control format indicator channel or the broadcast channel arranged in a fixed position, and outputs the demodulated/decoded control format indicator channel or broadcast channel to the control unit 21 (S20). Next, an HARQ indicator channel group into which an HARQ indicator channel including the response information addressed to its own mobile station device is multiplexed is extracted based on the HARQ indicator channel setting information included in the previously output control format indicator channel or broadcast channel input via the control unit 21 and the HARQ indicator channel group is output to the code multiplication unit 223 (S22). Next, the HARQ indicator channel group is multiplied by an orthogonal code based on a control signal input via the control unit 21, an extracted HARQ indicator channel is demodulated/decoded, and the response information is output to the control unit (S24).

Figure 23:
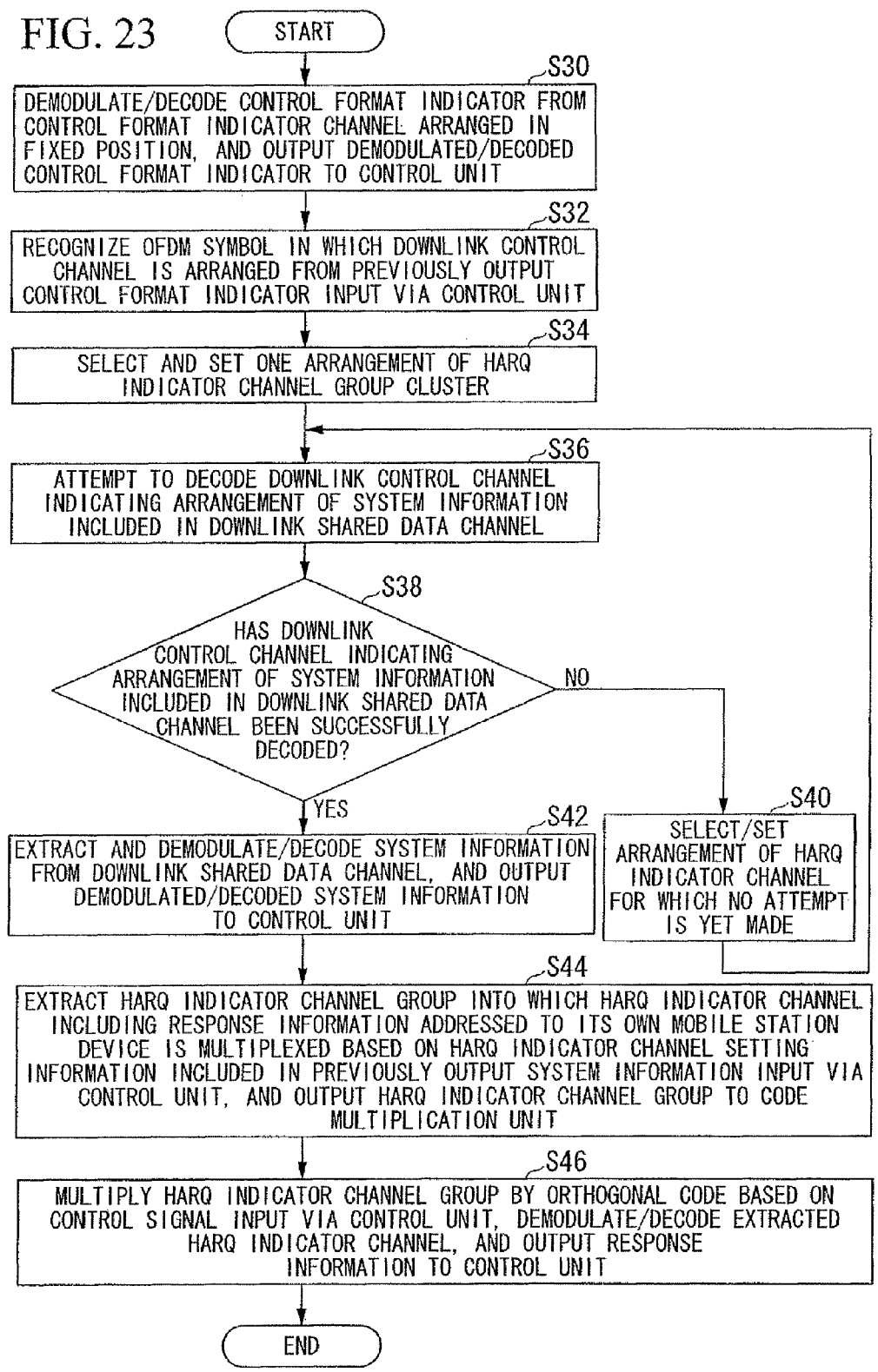
FIG. 23 is a flowchart illustrating an operation of receiving an HARQ indicator channel by the reception processing unit of the mobile station device of FIG. 20.

FIG. 23 is a flowchart illustrating an operation of receiving an HARQ indicator channel by the reception processing unit 22 of the mobile station device 2 of FIG. 20. The flowchart of FIG. 23 is the reception operation by the reception processing unit 22 when the HARQ indicator channel setting information is included in the system information of the downlink shared data channel.

First, the reception processing unit 22 demodulates/decodes the control format indicator from the control format indicator channel arranged in a fixed position, and outputs the demodulated/decoded control format indicator to the control unit 21 (S30). Next, an OFDM symbol in which the downlink control channel is arranged is recognized from the previously output control format indicator input via the control unit 21 (S32). Next, one arrangement of an HARQ indicator channel group cluster is selected and set (S34). Next, decoding of the downlink control channel indicating an arrangement of the system information included in the downlink shared data channel is attempted (S36). Next, it is determined whether or not the downlink control channel indicating the arrangement of the system information included in the downlink shared data channel has been successfully decoded (S38).

If it is determined that the downlink control channel indicating the arrangement of the system information included in the downlink shared data channel has been successfully decoded (step S38: Yes), the system information is extracted and demodulated/decoded from the downlink shared data channel and the demodulated/decoded system information is output to the control unit 21 (S42). Next, an HARQ indicator channel group into which an HARQ indicator channel including the response information addressed to its own mobile station device is multiplexed is extracted based on the HARQ indicator channel setting information included in the previously output system information input via the control unit 21 and the HARQ indicator channel group is output to the code multiplication unit (S44). Next, the HARQ indicator channel group is multiplied by an orthogonal code based on a control signal input via the control unit 21, an extracted HARQ indicator channel is demodulated/decoded, and the response information is output to the control unit 21 (S46).

On the other hand, if it is determined that the downlink control channel indicating the arrangement of the system information included in the downlink shared data channel has not been successfully decoded (step S38: No), an arrangement of an HARQ indicator channel for which no attempt is yet made is selected and set (S40), and the processing from step S36 to attempt to decode the downlink control channel is iterated.

The case where the HARQ indicator channel setting information shown in each subband of the downlink includes information for only a downlink subband in which a channel including the HARQ indicator channel setting information is arranged has been described in the present embodiment, but HARQ indicator channel setting information for all downlink subbands may be transmitted together.

When the HARQ indicator channel setting information for all the downlink subbands is transmitted together, it is possible to skip the processing of steps S34, S36, S38, and S40 so as to decode downlink control channels of other downlink subbands if the HARQ indicator channel setting information in one downlink subband is successfully received in the case (2) where the HARQ indicator channel setting information is included in the system information of the downlink shared data channel.

A procedure of receiving the HARQ indicator channel becomes simple if the HARQ indicator channel setting information is transmitted on a channel arranged in a fixed position like the control format indicator channel or the broadcast channel rather than a channel in which an arrangement is indicated by the downlink control channel like the downlink shared data channel.

If the HARQ indicator channel setting information is transmitted on the downlink shared data channel rather than the broadcast channel or the control format indicator channel, a coding rate, a modulation scheme, a quantity of arranged resource elements, or the like can be adaptively controlled and more information can be efficiently transmitted.

A method of transmitting the HARQ indicator channel setting information using one type of channel in each downlink subband has been described above with reference to the drawings, but the base station device 1 may transmit information indicating the number of HARQ indicator channel group clusters arranged in the downlink subband and information indicating which uplink subband is for an arranged HARQ indicator channel group cluster using different types of channels. The information indicating the number of HARQ indicator channel group clusters arranged in the downlink subband may be transmitted in each downlink subband. A different number of HARQ indicator channel group clusters may be arranged in each downlink subband.

Figure 24:
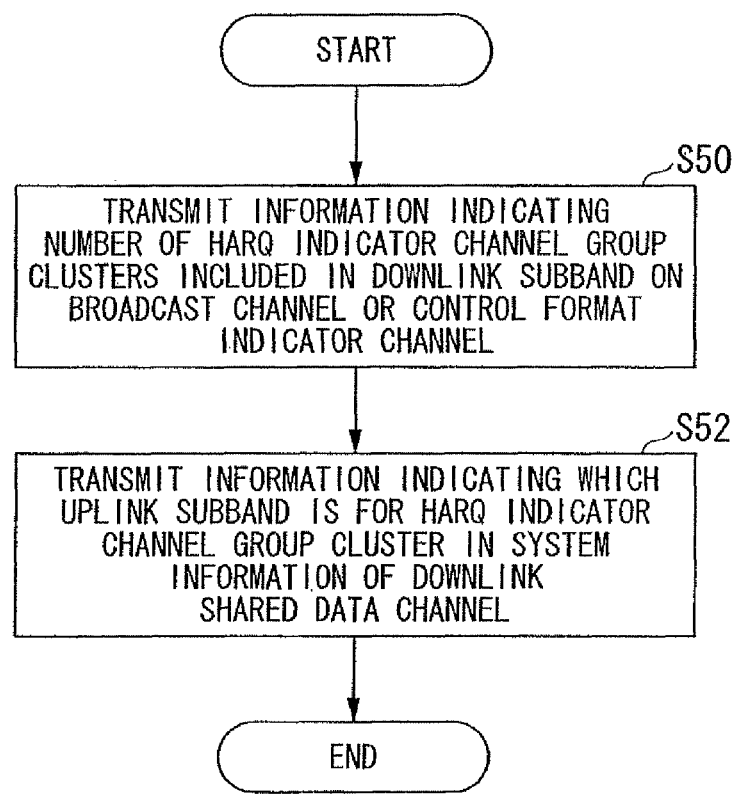
FIG. 24 is a flowchart illustrating a transmission operation of the transmission processing unit of the base station device of FIG. 5.

FIG. 24 is a flowchart illustrating a transmission operation of the transmission processing unit 13 of the base station device 1 of FIG. 5. The flowchart of FIG. 24 illustrates an operation when information indicating the number of HARQ indicator channel group clusters included in a corresponding subband for each downlink subband is transmitted on a channel of a fixed arrangement and information indicating which uplink subband is for an HARQ indicator channel group cluster is transmitted on a channel in which an arrangement is indicated by the downlink control channel.

The transmission processing unit 13 of the base station device 1 transmits the information indicating the number of HARQ indicator channel group clusters included in a corresponding subband for each downlink subband on the broadcast channel or the control format indicator channel (S50). Next, the information indicating which subband is for an HARQ indicator channel group cluster is transmitted in the system information of one downlink shared data channel integrated for all downlink subbands (S52).

Figure 25:
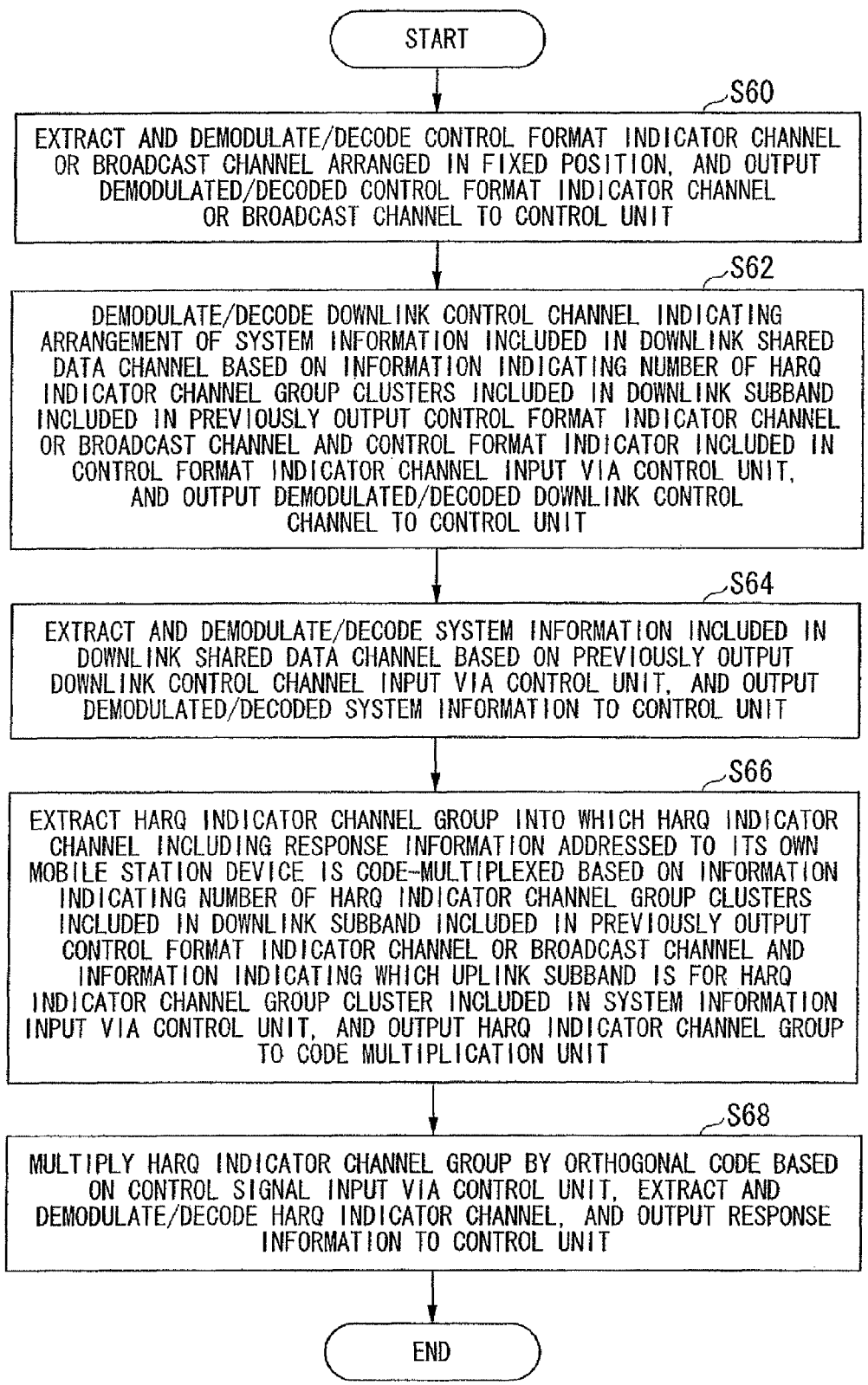
FIG. 25 is a flowchart illustrating a reception operation by the reception processing unit of the mobile station device of FIG. 20.

FIG. 25 is a flowchart illustrating a reception operation by the reception processing unit 22 of the mobile station device 2 of FIG. 20. The flowchart of FIG. 25 illustrates an operation of the reception processing unit 22 when the transmission processing unit 13 of the base station device 1 transmits HARQ indicator channel setting information according to the flowchart of FIG. 24.

The reception processing unit 22 of the base station device 2 extracts and demodulates/decodes the control format indicator channel or the broadcast channel arranged in a fixed position, and outputs the demodulated/decoded control format indicator channel or broadcast channel to the control unit 21 (S60). Next, the downlink control channel indicating an arrangement of the system information included in the downlink shared data channel is demodulated/decoded based on information indicating the number of HARQ indicator channel group clusters included in the downlink subband included in the previously output control format indicator channel or broadcast channel and the control format indicator included in the control format indicator channel input via the control unit 21, and the demodulated/decoded downlink control channel is output to the control unit 21 (S62). Next, the system information included in the downlink shared data channel is extracted and demodulated/decoded based on the previously output downlink control channel input via the control unit 21, and the demodulated/decoded system information is output to the control unit 21 (S64). Next, an HARQ indicator channel group into which an HARQ indicator channel including response information addressed to its own mobile station device is code-multiplexed is extracted based on information indicating the number of HARQ indicator channel group clusters included in the downlink subband included in the previously output control format indicator channel or broadcast channel and information indicating which uplink subband is for an HARQ indicator channel group cluster included in the system information input via the control unit 21, and is output to the code multiplication unit (S66). Next, the HARQ indicator channel group is multiplied by an orthogonal code based on a control signal input via the control unit 21, and the HARQ indicator channel is extracted and demodulated/decoded, and the response information is output to the control unit 21 (S68).

The embodiment in which the base station device 1 transmits information indicating the number of HARQ indicator channels arranged in the downlink subband and information indicating which subband is for an HARQ indicator channel group cluster has been described above with reference to the drawings, but the embodiment may be used in which information indicating the number of HARQ indicator channel group clusters for each subband of the downlink is integrated and arranged in each subband and the correspondence of an HARQ indicator channel and an uplink subband is recognized by a predetermined method. In the embodiment, a degree of freedom in arrangement of the HARQ indicator channel group cluster is reduced, but an amount of information to be transmitted by the base station device 1 can also be reduced. That is, information indicating which subband is for the HARQ indicator channel group cluster is unnecessary in the HARQ indicator channel setting information.

Figure 26:
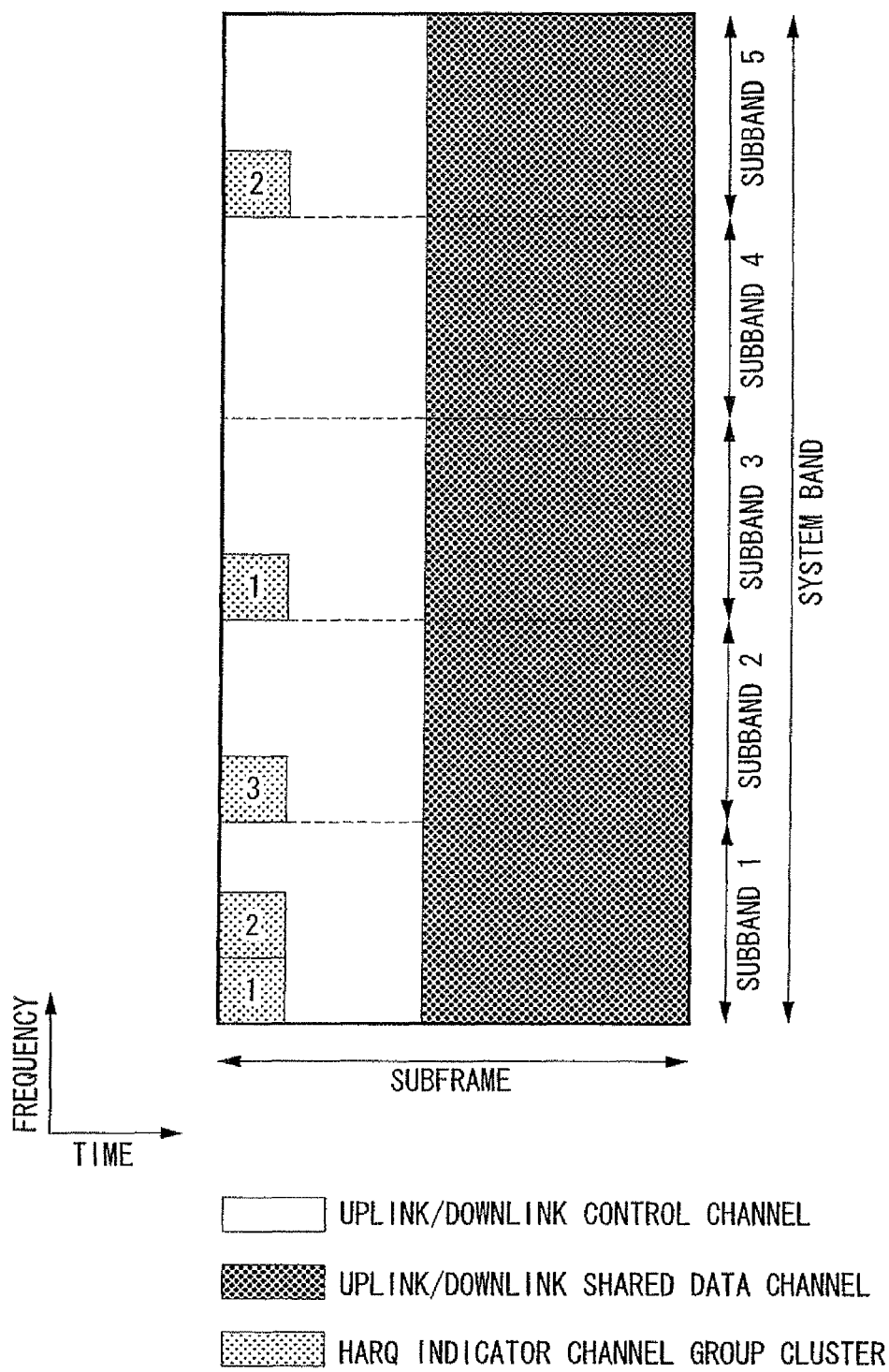
FIG. 26 is a diagram illustrating a method of arranging an HARQ indicator channel group cluster.
Figure 27:
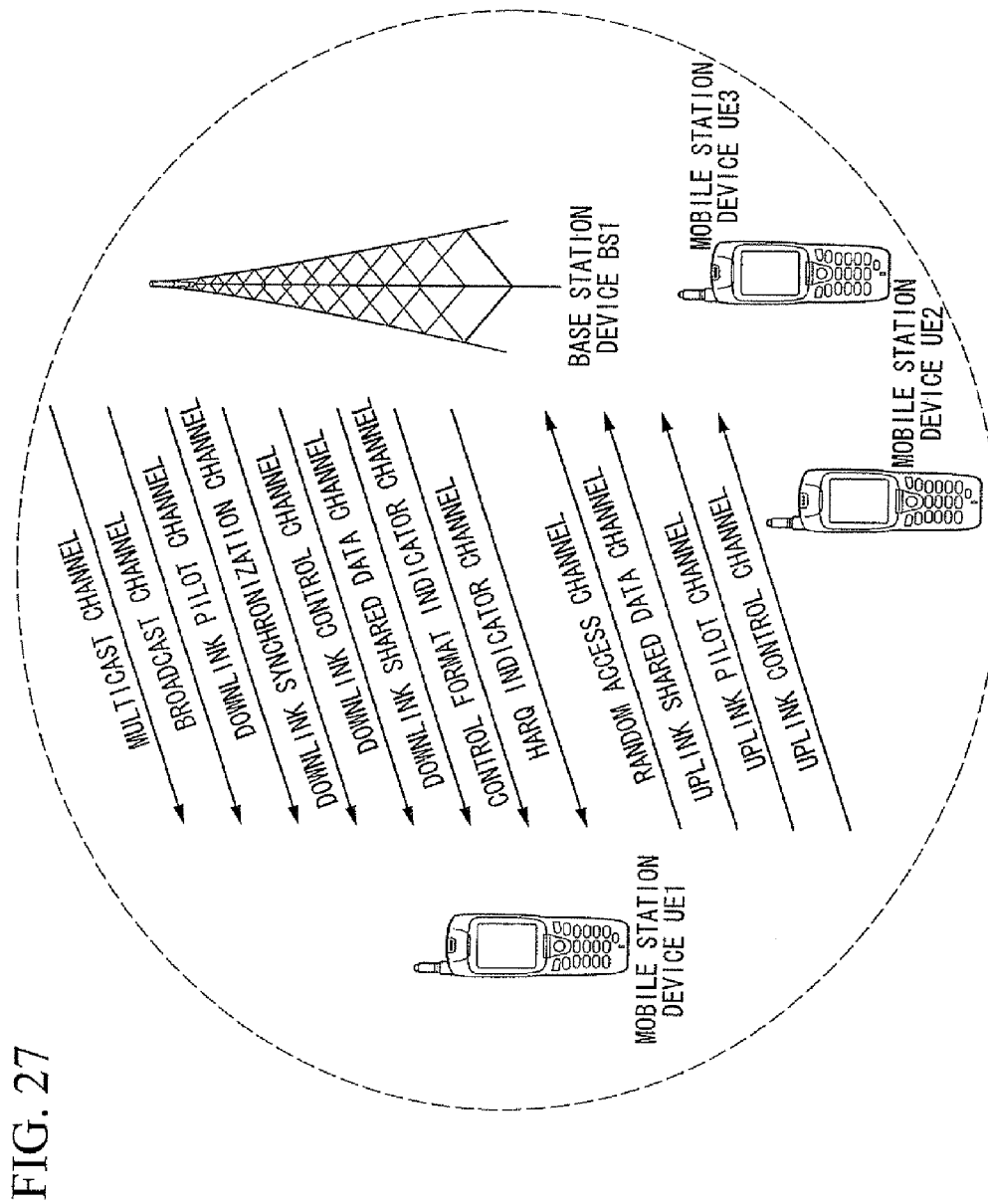
FIG. 27 is a diagram showing a schematic structure of a channel in EUTRA.
Figure 28:
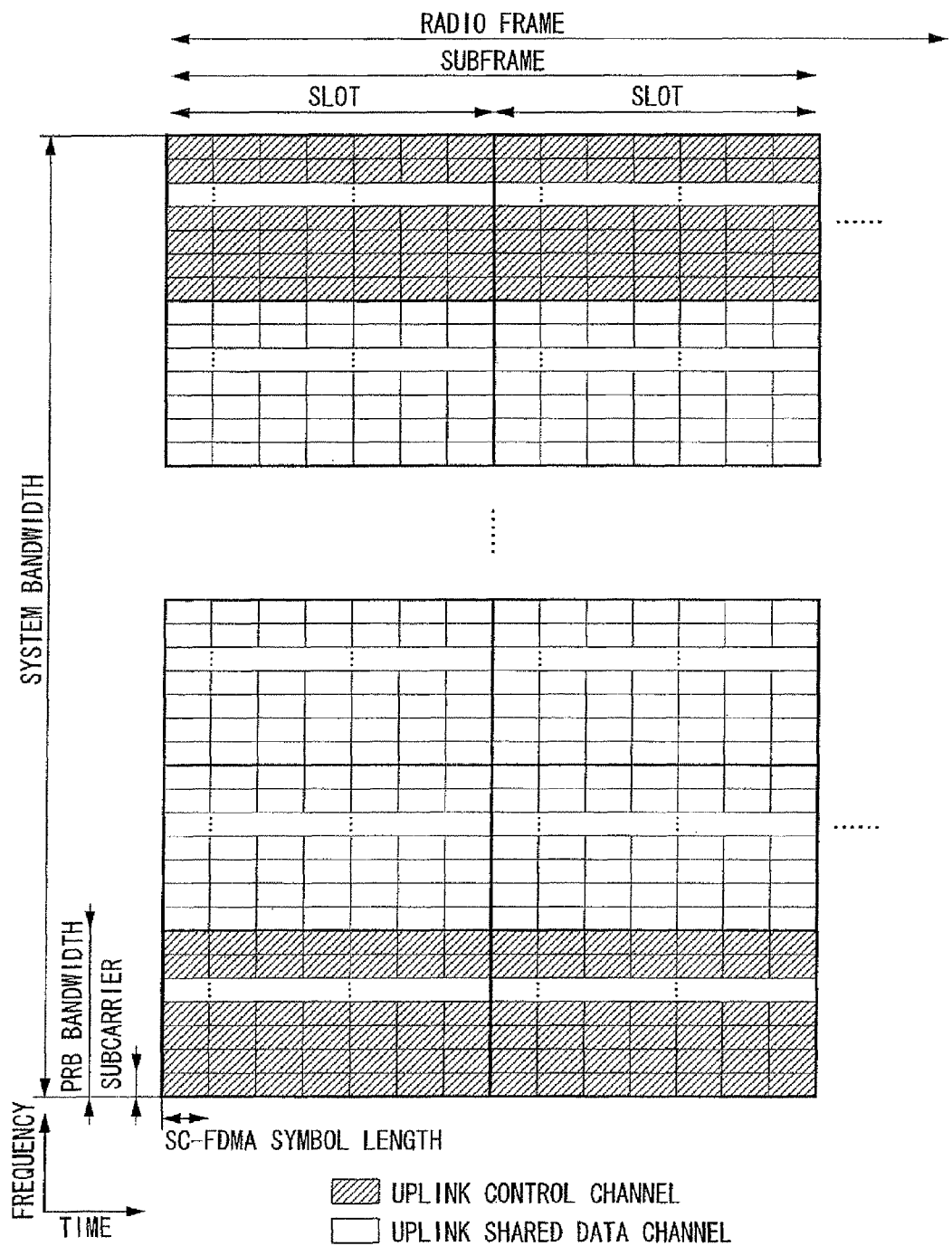
FIG. 28 is a diagram showing a schematic configuration of an uplink radio frame in EUTRA.
Figure 29:
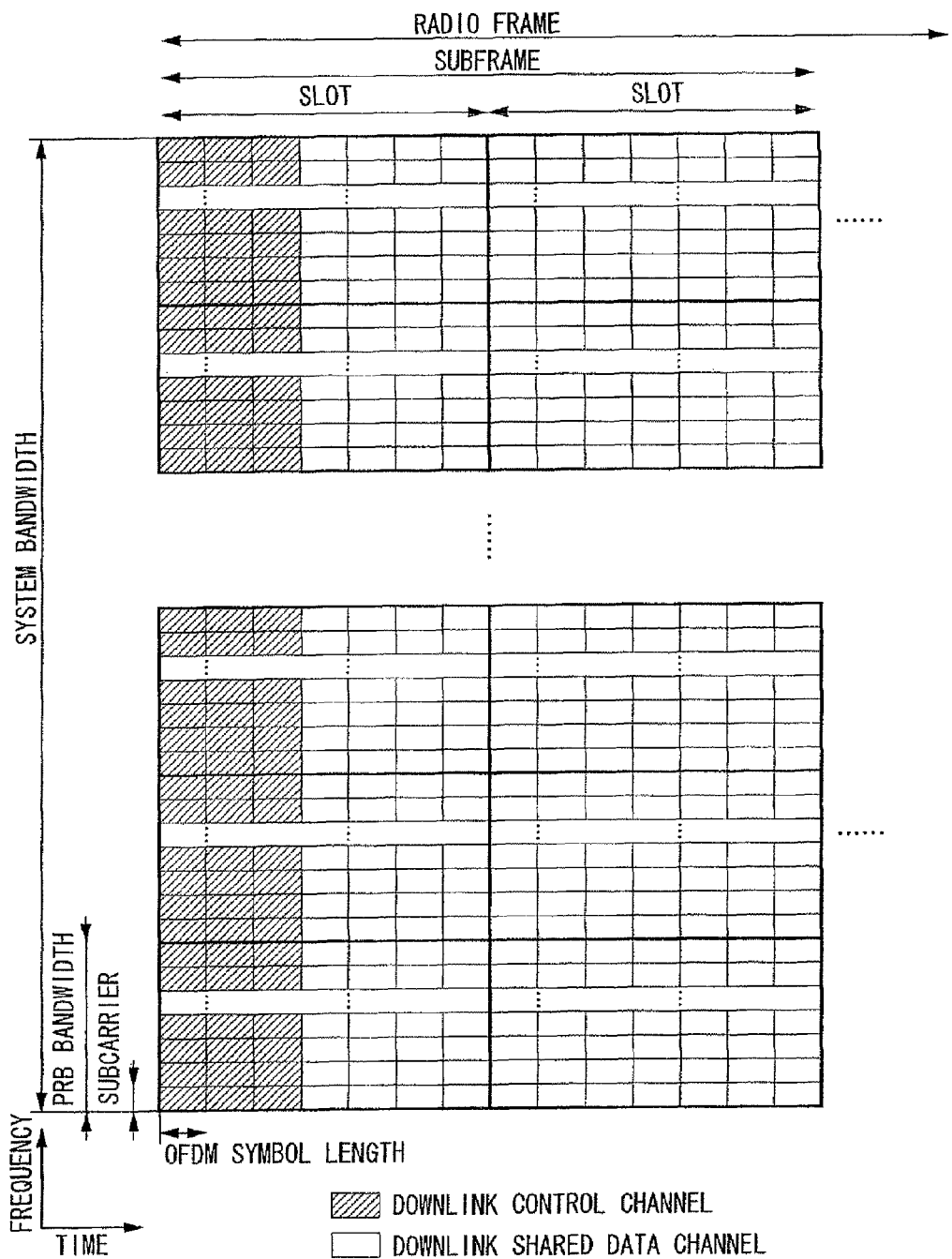
FIG. 29 is a diagram illustrating a schematic configuration of a downlink radio frame in EUTRA.
Figure 30:
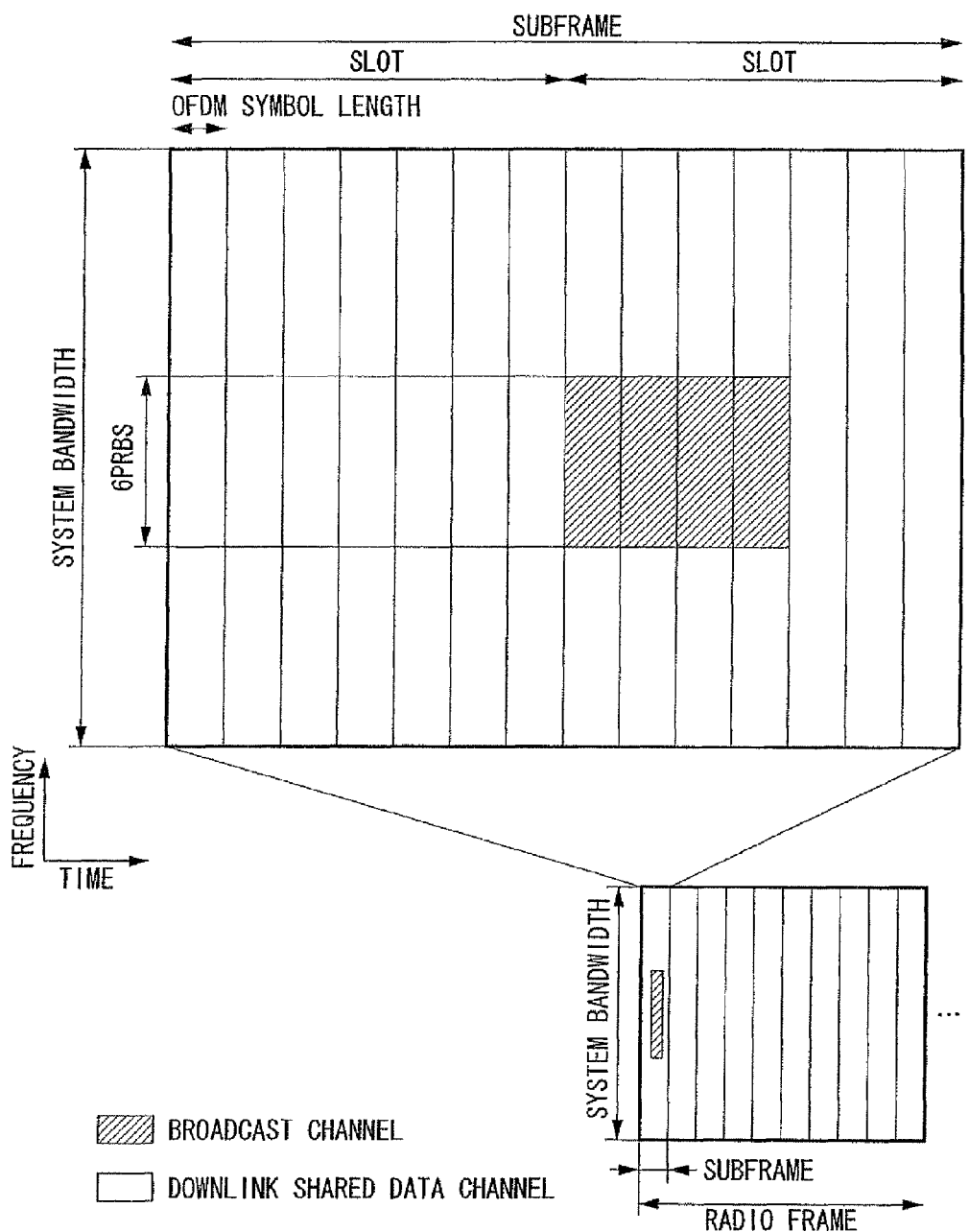
FIG. 30 is a diagram illustrating a broadcast channel arrangement in a downlink subframe of EUTRA.
Figures 31, 32:
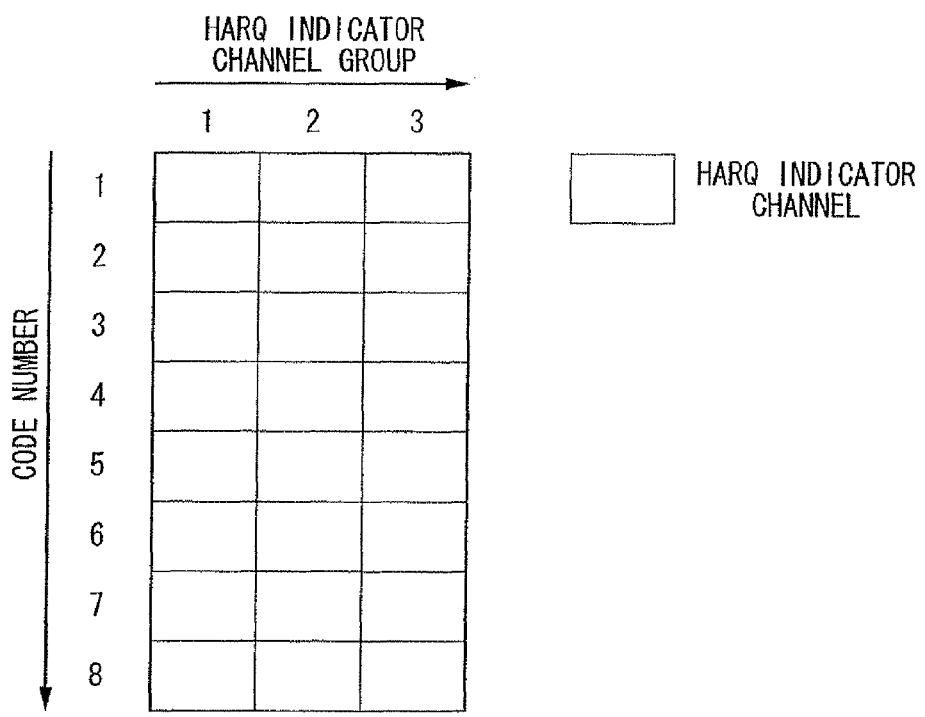
FIG. 31 is a diagram showing orthogonal codes used in code multiplexing in a frequency domain of an HARQ indicator channel of EUTRA.
FIG. 32 is a diagram illustrating the correspondence of an uplink shared data channel that is transmitted by a mobile station device and an HARQ indicator channel that is transmitted by a base station device in EUTRA.
Figure 33:
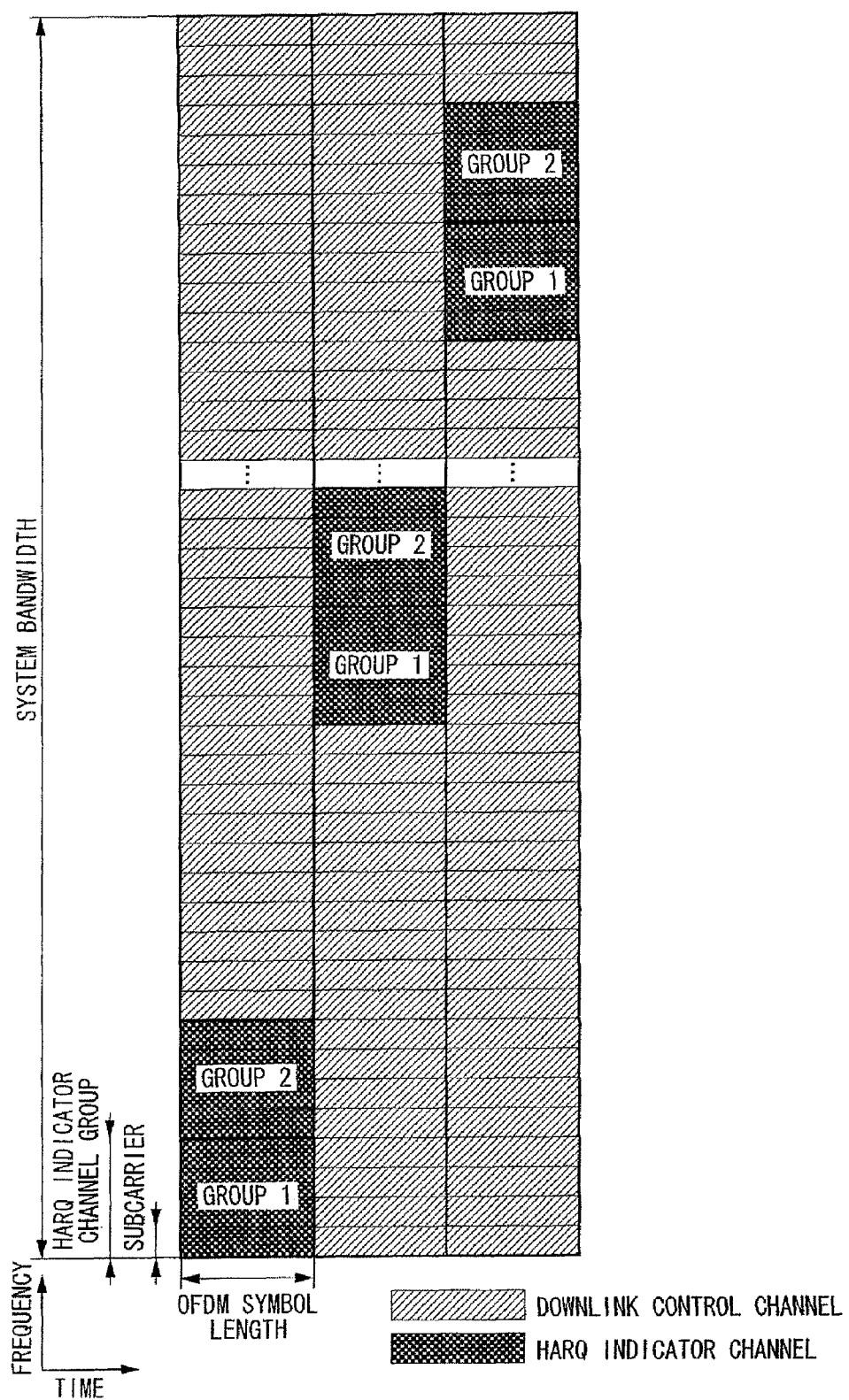
FIG. 33 is a diagram illustrating an HARQ indicator channel arrangement of EUTRA.
Figure 34:
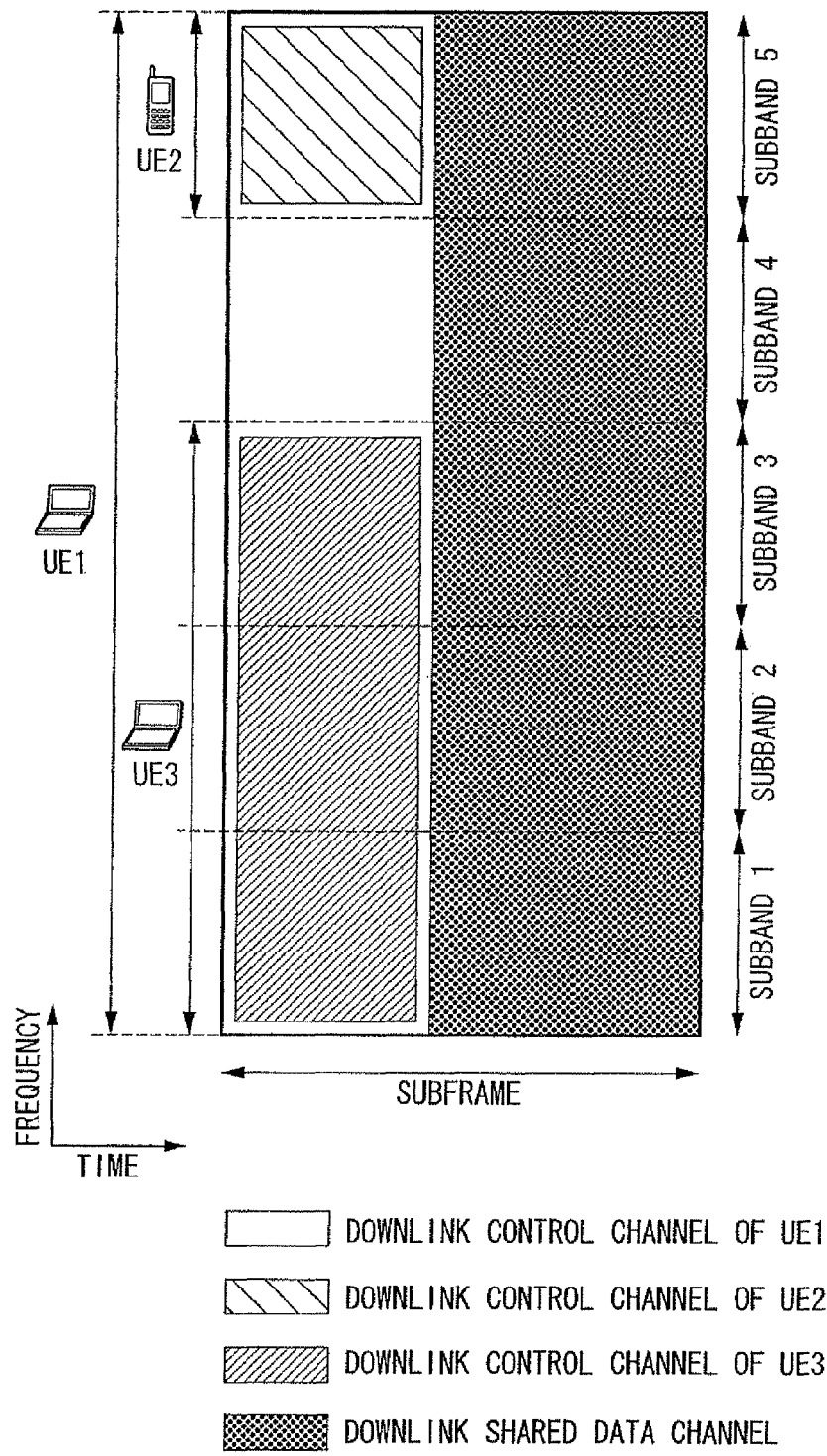
FIG. 34 is a diagram illustrating layered OFDMA proposed as a downlink radio access scheme of A-EUTRA.
Figure 35:
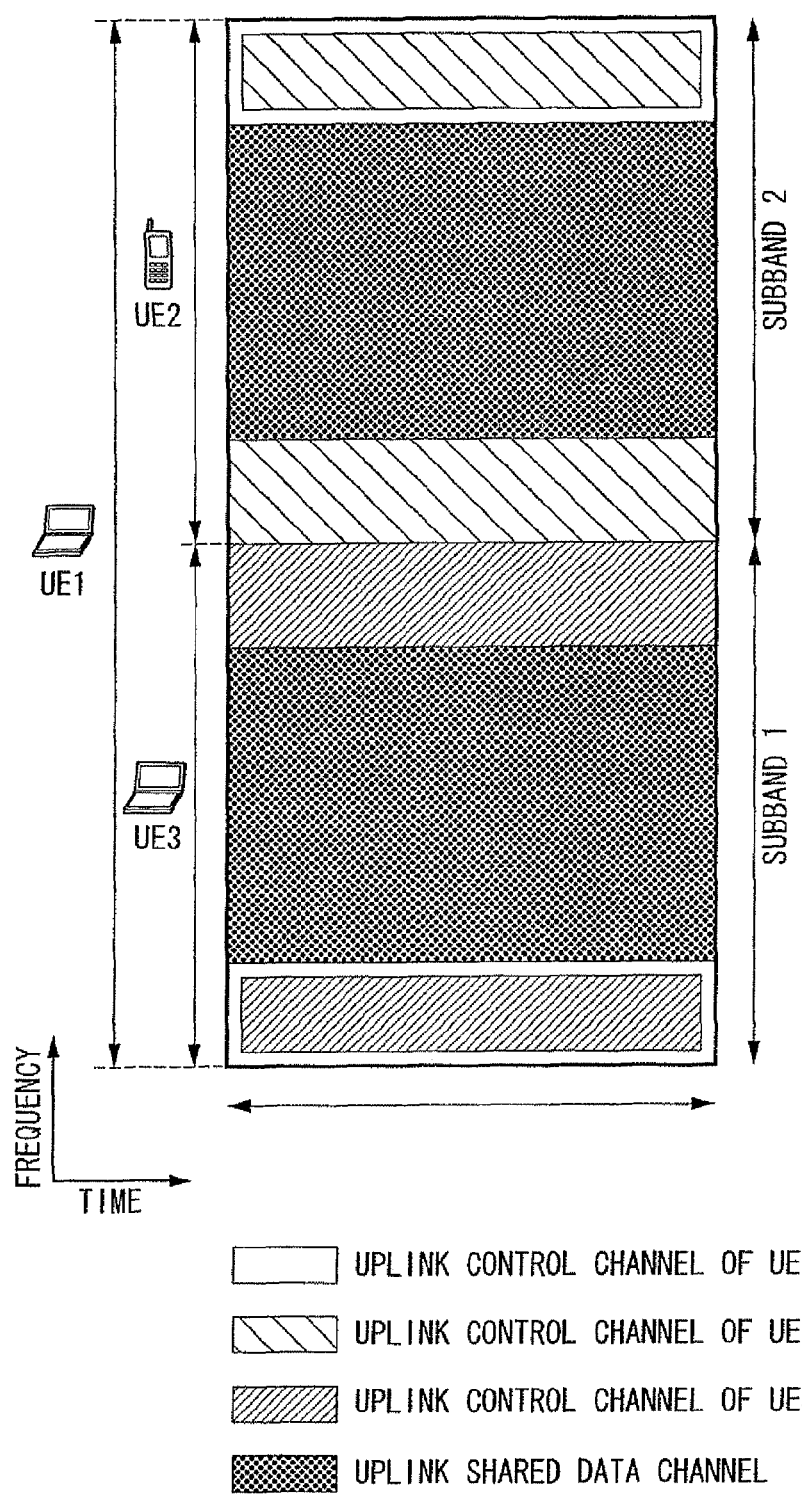
FIG. 35 is a diagram illustrating a scheme proposed as an uplink radio access scheme of A-EUTRA.

FIG. 26 is a diagram illustrating a method of arranging an HARQ indicator channel group cluster. In FIG. 26, the horizontal axis is a time axis, the vertical axis is a frequency axis, a system band in the frequency domain is shown, and only 1 subband in the time domain is shown. In FIG. 26, it is assumed that the number of downlink subbands is 5 and the number of uplink subbands is 3. Information indicating the number of HARQ indicator channels for each subband of the downlink is integrated and indicated by the broadcast channel, the control format indicator channel, or the downlink shared data channel of each subband. Two HARQ indicator channel group clusters are arranged in a downlink subband 1, one HARQ indicator channel group cluster is arranged in subbands 2, 3, and 5, and no HARQ indicator channel group cluster is arranged in a subband 4. Uplink subbands corresponding to HARQ indicator channel group clusters are made to correspond to the subbands 2 and 3 in order from the uplink subband 1 in order from an HARQ indicator channel group cluster arranged at a lower frequency in the entire system band. If all uplink subbands are made to correspond to HARQ indicator channel group clusters in one method, serial HARQ indicator channel group clusters are made to correspond to the uplink subbands in order from the uplink subband 1.

If the downlink subbands 2 and 3 are allocated to the mobile station device 2 in FIG. 26, either the uplink subband 1 or 3 or both of the uplink subbands 1 and 3 can be allocated to the mobile station device 2 since the mobile station device 2 can receive an HARQ indicator channel group cluster corresponding to the uplink subband 3 in the downlink subband 2 and receive an HARQ indicator channel group cluster corresponding to the uplink subband 1 in the downlink subband 3. However, if the mobile station device 2 may not receive 2 continuous subbands, separated subbands like the uplink subbands 1 and 3 may not allocated.

Here, at the time of causing the HARQ indicator channel group cluster to correspond to the uplink subband, the correspondence to all uplink subbands is made by increasing a corresponding uplink subband order as 1, 2, and 3 and the next correspondence to subbands is made in reverse order as 3, 2, and 1. That is, if the number of uplink subbands is 3, the mobile station device 2 does not receive HARQ indicator channel group clusters of subbands separated in the frequency direction of the uplink by making the association in order of 1→2→3→2→1→2→3 . . . .

As an order of associating the uplink subbands, there are other orders as follows. There are 1→2→3→1→2→ . . . , 2→3→1→2→3→ . . . , 3→1→2→3→1→ . . . , and the like. An order of associating an HARQ indicator channel group cluster to an uplink subband may be predetermined in 2 or 3 ways, and the base station device 1 may signal any used ordering to the mobile station device 2.

In the embodiment, the number of HARQ indicator channel group clusters arranged in the downlink subband may be fixed. In the embodiment, an amount of information to be transmitted by the base station device 1 can be reduced although a degree of freedom in arrangement of an HARQ indicator channel group cluster is reduced. That is, information indicating the number of HARQ indicator channels is unnecessary in the HARQ indicator channel setting information. For example, when 1 HARQ indicator channel group cluster is necessarily arranged in the downlink subband, it is preferable that the HARQ indicator channel setting information indicate only information indicating which subband is for an HARQ indicator channel group cluster arranged in each subband.

A program that operates in the mobile station device 2 and the base station device 1 according to the present invention is a program that controls a central processing unit (CPU) or the like (a program that causes a computer to function) so that the function of the above-described embodiment according to the present invention is realized. Information to be handled in these devices is temporarily accumulated in a random access memory (RAM) upon processing. Thereafter, the information is stored in various types of ROM such as a flash read only memory (ROM) or a hard disk drive (HDD), and is read and corrected/written by the CPU if necessary.

A computer readable recording medium records a program for realizing functions of the radio resource control unit 10 and the control unit 11 of FIG. 5, the downlink shared data channel processing unit 100, the control format indicator channel processing unit 110, the HARQ indicator channel processing unit 120, the broadcast channel processing unit 130, the downlink control channel processing unit 140, the downlink pilot channel generation unit 150, the multiplexing unit 160, the IFFT unit 171, the GI insertion unit 172, the D/A unit 173, and the transmission RF unit 174 of FIG. 6, the control unit 21 of FIG. 20, and the reception RF unit 274, the A/D unit 273, the GI removal unit 272, the FFT unit 271, the demultiplexing unit 260, the propagation channel estimation unit 280, the propagation channel compensation unit 290, the code multiplication unit 223, the demodulation unit 222, and the decoding unit 221 of FIG. 21. The processing of each unit may be performed by enabling a computer system to read and execute the program recorded on the recording medium. The "computer system" used herein includes an OS and hardware, such as peripheral devices.

The "computer readable recording medium" is a portable medium such as a flexible disc, magneto-optical disc, ROM and CD-ROM, and a storage device, such as a hard disk, built in the computer system. In addition, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

A wireless communication system of the present invention is applicable to a mobile station device and a base station device of a mobile communication system of a mobile phone or the like.

REFERENCE SYMBOLS

1: Base station device
2: Mobile station device
10: Radio resource processing unit
11: Control unit of base station device
12: Reception processing unit of base station device
13: Transmission processing unit of base station device
21: Control unit of mobile station device
22: Reception processing unit of mobile station device
23: Transmission processing unit of mobile station device
100: Downlink shared data channel processing unit
101: Turbo encoding unit
102: Data modulation unit
110: Control format indicator channel processing unit
111: Block encoding unit
112: QPSK modulation unit
120: HARQ indicator channel processing unit
121: Iterative encoding unit
122: BPSK modulation unit
123: Code multiplication unit
130: Broadcast channel processing unit
131: Convolutional encoding unit
132: QPSK modulation unit
140: Downlink control channel processing unit
141: Convolutional encoding unit
142: QPSK modulation unit
150: Downlink pilot channel generating unit
160: Multiplexing unit
170: Transmission antenna-specific transmission processing unit
171: IFFT unit
172: GI insertion unit
173: D/A unit
174: Transmission RF unit
221: Decoding unit
222: Demodulation unit
223: Code multiplication unit
260: Demultiplexing unit
270: Receiving unit
271: FFT unit
272: GI removal unit
273: A/D unit
274: Reception RF unit
280: Propagation channel estimation unit
290: Propagation channel compensation unit

The invention claimed is:

1. A mobile station device which communicates with a base station device, where the base station device allocates a plurality of uplink and downlink subbands to the mobile station device, the mobile station device comprising:
a transmitting section configured to transmit, to the base station device, first data by using a first uplink subband and second data by using a second uplink subband, the first uplink subband and the second uplink subband being included in the plurality of the allocated uplink subbands; and
a receiving section configured to receive, from the base station device, first response information for the first data and second response information for the second data, the first response information and the second response information being received by using Hybrid Automatic Repeat reQuest (HARQ) indicator channels within one downlink subband included in the plurality of the allocated downlink subbands.

2. The mobile station device according to claim 1, wherein the first response information and the second response information indicate whether the base station device correctly received the data transmitted from the mobile station device or not.

3. The mobile station device according to claim 1, wherein
the receiving section is further configured to receive, from the base station device, data channel(s) and control channel(s) by using the plurality of the allocated downlink subbands, and
the transmitting section is further configured to transmit, to the base station device, data channel(s) and control channel(s) by using the plurality of the allocated uplink subbands.

4. The mobile station device according to claim 1, wherein each of the plurality of uplink and downlink subbands is a unit within which the base station device allocates a frequency band for communication to the mobile station device, the subbands comprising a plurality of physical resource blocks.

5. A base station device comprising:
a control section configured to allocate a plurality of uplink and downlink subbands to a mobile station device;
a receiving section configured to receive, from the mobile station device, first data by using a first uplink subband and second data by using a second uplink subband, the first uplink subband and the second uplink subband being included in the plurality of the allocated uplink subbands; and
a transmitting section configured to transmit, to the mobile station device, first response information for the first data and second response information for the second data, the first response information and the second response information being transmitted by using Hybrid Automatic Repeat reQuest (HARQ) indicator channels within one downlink subband included in the plurality of the allocated downlink subbands.

6. The base station device according to claim 5, wherein the first response information and the second response information indicate whether the base station device correctly received the data transmitted from the mobile station device or not.

7. The base station device according to claim 6, wherein
the transmitting section is further configured to transmit, to the mobile station device, data channel(s) and control channel(s) by using the plurality of the allocated downlink subbands allocated to the mobile station device, and
the receiving section is further configured to receive, from the mobile station device, data channel(s) and control channel(s) by using the plurality of the allocated uplink subbands allocated to the mobile station device.

8. A base station device comprising:
a control section configured to allocate one or a plurality of uplink subbands and a plurality of downlink subbands to a plurality of mobile station devices;
a receiving section configured to receive first data from a first mobile station device and second data from a second mobile station device, the first data and the second data being transmitted by using one same uplink subband included in the plurality of the allocated uplink subbands, the first mobile station device and the second mobile station device being among the plurality of mobile station devices; and
a transmitting section configured to transmit first response information for the first data by using a first Hybrid Automatic Repeat reQuest (HARQ) indicator channel within a first downlink subband, and second response information for the second data by using a second HARQ indicator channel within a second downlink subband,
the first downlink subband and the second downlink subband are different subbands included in the plurality of downlink subbands.

9. A wireless communication method performed by a mobile station device communicating with a base station device, the base station device allocating a plurality of uplink and downlink subbands, the wireless communication method comprising:
transmitting, to the base station device, first data by using a first uplink subband and second data by using a second uplink subband, the first uplink subband and the second uplink subband being included in the plurality of the allocated uplink subbands; and
receiving, from the base station device, first response information for the first data and second response information for the second data, the first response information and the second response information being received by using Hybrid Automatic Repeat reQuest (HARQ) indicator channels within one downlink subband included in the plurality of the allocated downlink subbands.

10. A wireless communication method performed by a base station device communicating with a mobile station device, the wireless communication method comprising:
allocating a plurality of uplink and downlink subbands;
receiving, from the mobile station device, first data by using a first uplink subband and second data by using a second uplink subband, the first uplink subband and the second uplink subband being included in the plurality of the allocated uplink subbands; and
transmitting, to the mobile station device, first response information for the first data and second response information for the second data, the first response information and the second response information being transmitted by using Hybrid Automatic Repeat reQuest (HARQ) indicator channels within one downlink subband included in the plurality of the allocated downlink subbands.

11. A wireless communication method performed by a base station device communicating with a plurality of mobile station devices the wireless communication method comprising:
allocating one or a plurality of uplink subbands and one or a plurality of downlink subbands to the plurality of the mobile station devices;
receiving first data from a first mobile station device and second data from a second mobile station device, the first data and the second data being transmitted by using one same uplink subband included in the plurality of the allocated uplink subbands, the first mobile station device and the second mobile station device being among the plurality of mobile station devices; and
transmitting first response information for the first data by using a first Hybrid Automatic Repeat reQuest (HARQ) indicator channel within a first downlink subband, and second response information for the second data by using a second HARQ indicator channel within a second downlink subband,
the first downlink subband and the second downlink subband are different subbands included in the plurality of downlink subbands.

12. A base station device comprising:
a control section configured to allocate a plurality of uplink and downlink subbands to a mobile station device;
a receiving section configured to receive, from the mobile station device, first data by using a first uplink subband and second data by using a second uplink subband, the first uplink subband and the second uplink subband being included in the plurality of the allocated uplink subbands; and
a transmitting section configured to transmit, to the mobile station device, first response information for the first data and second response information for the second data, the first response information and the second response information being transmitted by using Hybrid Automatic Repeat reQuest (HARQ) indicator channels within one downlink subband included in the plurality of the allocated downlink subbands based on setting information regarding an arrangement of the first response information and the second response information in the allocated downlink subbands.

13. The base station according to claim 12, wherein
the setting information indicates the correspondence between the allocated uplink subbands and the first and second response information, and the setting information is transmitted on downlink shared channel.

14. A base station device comprising:
a control section configured to allocate one or a plurality of uplink subbands and a plurality of downlink subbands to a plurality of mobile station devices;
a receiving section configured to receive first data from a first mobile station device and second data from a second mobile station device, the first data and the second data being transmitted by using one same uplink subband included in the plurality of the allocated uplink subbands, the first mobile station device and the second mobile station device being among the plurality of mobile station devices; and
a transmitting section configured to transmit first response information for the first data by using a first Hybrid Automatic Repeat reQuest (HARQ) indicator channel within a first downlink subband, and second response information for the second data by using a second HARQ indicator channel within a second downlink subband, based on setting information regarding an arrangement of the first response information and the second response information in the allocated plurality downlink subbands, the first downlink subband and the second downlink subband are different subbands included in the plurality of downlink subbands.

15. The base station according to claim 14, wherein the setting information indicates the correspondence between the allocated one or a plurality of uplink subbands and the first and second response information, and the setting information is transmitted on downlink shared channel.

* * * * *